US008269819B2

(12) United States Patent
Kikuchi

(10) Patent No.: US 8,269,819 B2
(45) Date of Patent: Sep. 18, 2012

(54) IMAGE GENERATING APPARATUS FOR GENERATING THREE-DIMENSIONAL IMAGE HAVING HIGH VISIBILITY

(75) Inventor: Masaaki Kikuchi, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 552 days.

(21) Appl. No.: 12/555,119

(22) Filed: Sep. 8, 2009

(65) Prior Publication Data
US 2010/0079579 A1    Apr. 1, 2010

(30) Foreign Application Priority Data

Sep. 29, 2008  (JP) ................................ P2008-250002

(51) Int. Cl.
*H04N 13/02* (2006.01)
(52) U.S. Cl. ............... 348/46; 348/43; 348/51; 359/371; 382/113; 345/419
(58) Field of Classification Search ............ 348/46, 348/51, 43
See application file for complete search history.

(56) References Cited

U.S. PATENT DOCUMENTS

| | | | | |
|---|---|---|---|---|
| 5,929,980 | A * | 7/1999 | Yamaguchi et al. | 356/4.03 |
| 6,525,875 | B1 * | 2/2003 | Lauer | 359/371 |
| 6,580,448 | B1 * | 6/2003 | Stuttler | 348/46 |
| 6,914,623 | B2 * | 7/2005 | Ogawa | 348/45 |
| 6,950,535 | B2 * | 9/2005 | Sibayama et al. | 382/113 |
| 7,053,937 | B1 * | 5/2006 | Aoki | 348/231.3 |
| 7,425,951 | B2 * | 9/2008 | Fukushima et al. | 345/419 |
| 2007/0236560 | A1 * | 10/2007 | Lipton et al. | 348/43 |
| 2008/0018732 | A1 * | 1/2008 | Moller | 348/51 |
| 2009/0002483 | A1 * | 1/2009 | Yanagawa et al. | 348/46 |
| 2010/0079579 | A1 * | 4/2010 | Kikuchi | 348/43 |
| 2010/0182480 | A1 * | 7/2010 | Nakajima | 348/333.09 |

FOREIGN PATENT DOCUMENTS

| | | |
|---|---|---|
| JP | 9-181913 A | 7/1997 |
| JP | 2004-248213 A | 9/2004 |
| JP | 2005-167310 A | 6/2005 |

OTHER PUBLICATIONS

Japanese Office Action dated May 29, 2012 (and English translation thereof) in counterpart Japanese Application No. 2008-250002.

* cited by examiner

*Primary Examiner* — Michael Won
(74) *Attorney, Agent, or Firm* — Holtz, Holtz, Goodman & Chick, PC

(57) ABSTRACT

An image generating apparatus includes: a correction unit configured to correct point information indicating correspondence between a plurality of pieces of point information indicating feature points of subjects in an image and a plurality of pieces of distance information of the respective pieces of point information so as to reduce the pieces of distance information belonging to a distance range that is longer than a distance indicated by a specific distance information included in the pieces of distance information; an image information generation unit configured to generate image information for expressing a three-dimensional image based on the point information corrected by the correction unit; and a display unit configured to display the three-dimensional image based on the image information generated by the image information generation unit.

13 Claims, 21 Drawing Sheets

FIG.8

| FEATURE POINT | X COORDINATE | Y COORDINATE | Z COORDINATE |
|---|---|---|---|
| FEATURE POINT 1 OF PERSON 41 | 0.05 (m) | 0.10 (m) | 2.00 (m) |
| FEATURE POINT 2 OF PERSON 41 | ... | ... | 2.00 (m) |
| ... | ... | ... | ... |
| FEATURE POINT 1 OF PERSON 42 | ... | ... | 2.55 (m) |
| FEATURE POINT 2 OF PERSON 42 | ... | ... | 2.52 (m) |
| ... | ... | ... | ... |
| FEATURE POINT 1 OF CAR 43 | ... | ... | 4.06 (m) |
| FEATURE POINT 2 OF CAR 43 | ... | ... | 4.06 (m) |
| ... | ... | ... | ... |
| FEATURE POINT 1 OF BUILDING 44 | ... | ... | 8.20 (m) |
| FEATURE POINT 2 OF BUILDING 44 | ... | ... | 8.38 (m) |
| ... | ... | ... | ... |

81

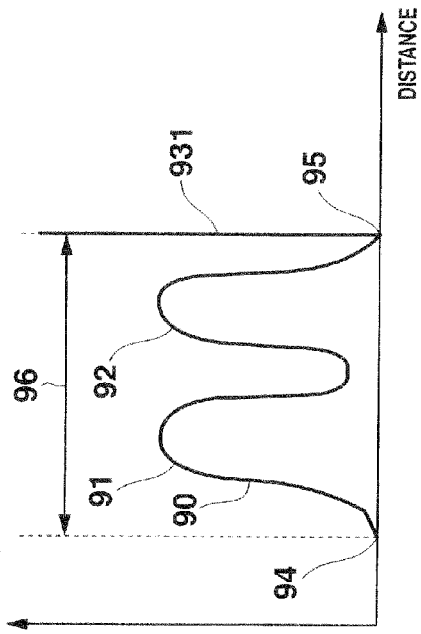
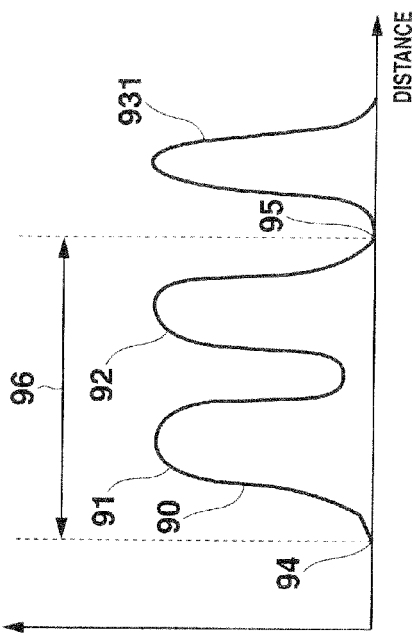
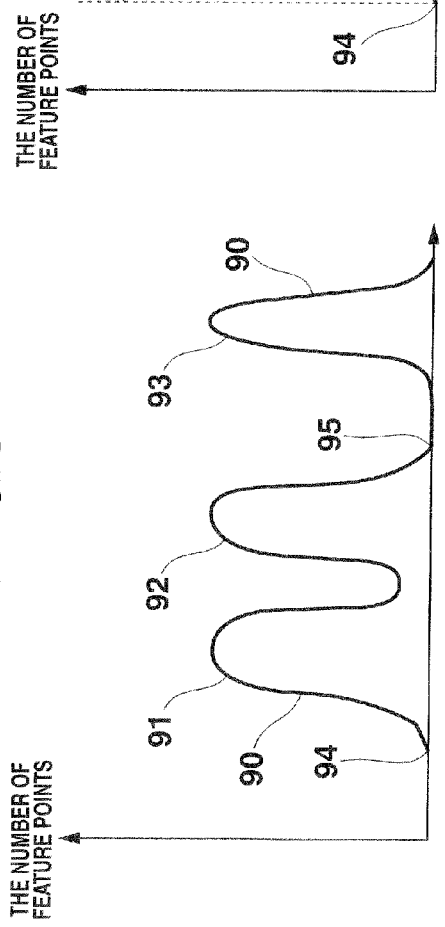
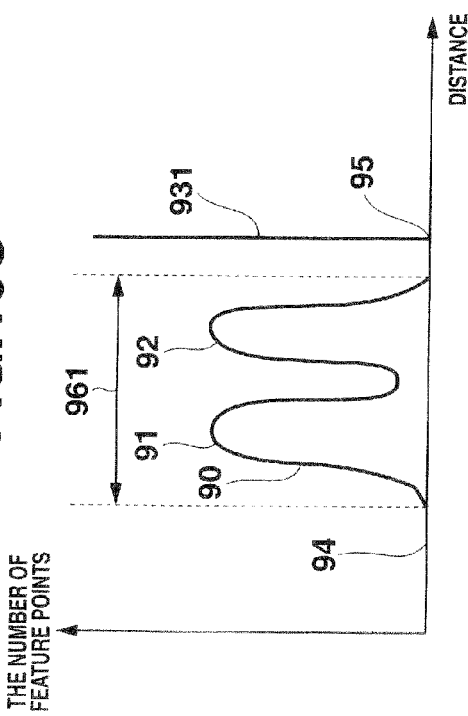

FIG.11A

| FEATURE POINT | X COORDINATE | Y COORDINATE | Z COORDINATE |
|---|---|---|---|
| FEATURE POINT 1 OF PERSON 41 | 0.05 (m) | 0.10 (m) | 2.00 (m) |
| FEATURE POINT 2 OF PERSON 41 | ... | ... | 2.00 (m) |
| ... | ... | ... | ... |
| FEATURE POINT 1 OF PERSON 42 | ... | ... | 3.55 (m) |
| FEATURE POINT 2 OF PERSON 42 | ... | ... | 3.52 (m) |
| ... | ... | ... | ... |
| FEATURE POINT 1 OF CAR 43 | ... | ... | 4.06 (m) |
| FEATURE POINT 2 OF CAR 43 | ... | ... | 4.06 (m) |
| ... | ... | ... | ... |
| FEATURE POINT 1 OF BUILDING 44 | ... | ... | 4.20 (m) |
| FEATURE POINT 2 OF BUILDING 44 | ... | ... | 4.20 (m) |
| ... | ... | ... | 4.20 (m) |

FIG.11B

| FEATURE POINT | X COORDINATE | Y COORDINATE | Z COORDINATE |
|---|---|---|---|
| FEATURE POINT 1 OF PERSON 41 | 0.05 (m) | 0.10 (m) | 2.50 (m) |
| FEATURE POINT 2 OF PERSON 41 | ... | ... | 2.50 (m) |
| ... | ... | ... | ... |
| FEATURE POINT 1 OF PERSON 42 | ... | ... | 3.25 (m) |
| FEATURE POINT 2 OF PERSON 42 | ... | ... | 3.22 (m) |
| ... | ... | ... | ... |
| FEATURE POINT 1 OF CAR 43 | ... | ... | 3.50 (m) |
| FEATURE POINT 2 OF CAR 43 | ... | ... | 3.50 (m) |
| ... | ... | ... | ... |
| FEATURE POINT 1 OF BUILDING 44 | ... | ... | 4.20 (m) |
| FEATURE POINT 2 OF BUILDING 44 | ... | ... | 4.20 (m) |
| ... | ... | ... | 4.20 (m) |

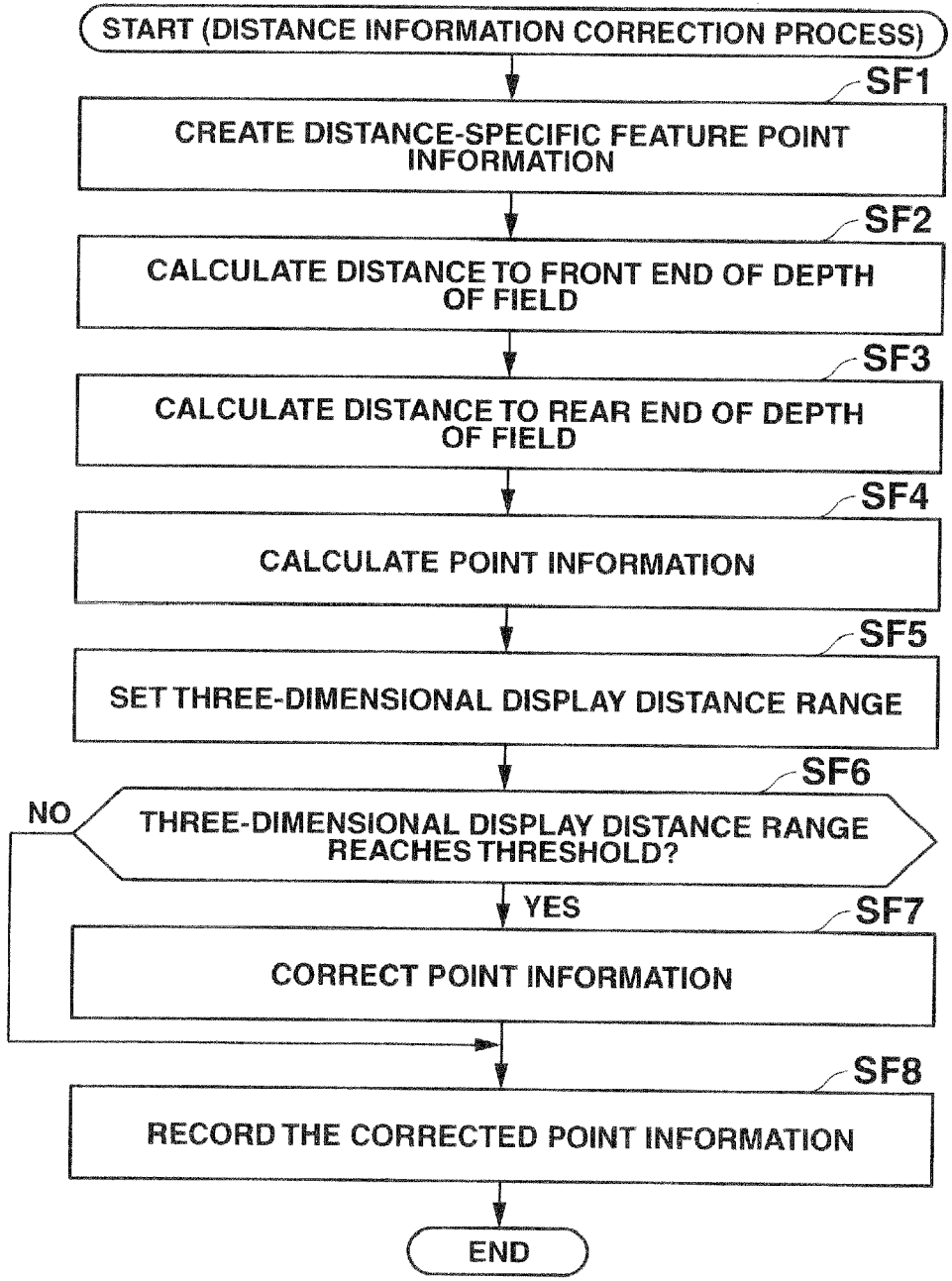

FIG.21

| FEATURE POINT | X COORDINATE | Y COORDINATE | Z COORDINATE |
|---|---|---|---|
| FEATURE POINT 1 OF PERSON 41 | 0.05 (m) | 0.10 (m) | 2.00 (m) |
| FEATURE POINT 2 OF PERSON 41 | ... | ... | 2.00 (m) |
| ... | ... | ... | ... |
| FEATURE POINT 1 OF PERSON 42 | ... | ... | 3.55 (m) |
| FEATURE POINT 2 OF PERSON 42 | ... | ... | 3.52 (m) |
| ... | ... | ... | ... |
| FEATURE POINT 1 OF CAR 43 | ... | ... | 4.06 (m) |
| FEATURE POINT 2 OF CAR 43 | ... | ... | 4.06 (m) |
| ... | ... | ... | ... |
| FEATURE POINT 1 OF BUILDING 44 | ... | ... | 4.00 (m) |
| FEATURE POINT 2 OF BUILDING 44 | ... | ... | 4.00 (m) |
| ... | ... | ... | 4.00 (m) |

84

IMAGE GENERATING APPARATUS FOR GENERATING THREE-DIMENSIONAL IMAGE HAVING HIGH VISIBILITY

CROSS-REFERENCE TO THE RELATED APPLICATION(S)

The present application is based upon and claims priority from prior Japanese Patent Application No. 2008-250002, filed on Sep. 29, 2008, the entire contents of which are incorporated herein by reference.

TECHNICAL FIELD

The present invention relates to a technique for generating a three-dimensional image having high visibility.

BACKGROUND

There have been known a technique of playing back subject images as a three-dimensional image by using a stereo vision of recognizing distance information between subjects by measuring parallax between two photographic images captured by a stereo camera.

In this conventional technique, there is however a possibility that visibility of the three-dimensional image may be lowered because the sizes of triangular polygons forming the three-dimensional image are affected by information of distances between points on the subjects. When, for example, the distance between subjects is large, the size of an image of a subject located near the camera is reduced extremely as shown in FIG. 22. In this manner, visibility of the three-dimensional image is lowered.

A publication JP-A-2005-167310 discloses a technique for changing a display image from a three-dimensional image to a two-dimensional image when the distance between subjects is too short or too long to display a three-dimensional image, that is, when the captured image is unsuited to three-dimensional expression. According to the technique described in the publication, the captured image can be always displayed in an optimum form.

In the technique described in the publication, JP-A-2005-167310, there is however a problem that a user cannot three-dimensionally confirm the state of a subject image when a captured image is unsuited to three-dimensional expression so that an image to be displayed is changed to a two-dimensional image completely.

SUMMARY

One aspect of the invention provides an image generating apparatus including: a correction unit configured to correct point information indicating correspondence between a plurality of pieces of point information indicating feature points of subjects in an image and a plurality of pieces of distance information of the respective pieces of point information so as to reduce the pieces of distance information belonging to a distance range that is longer than a distance indicated by a specific distance information included in the pieces of distance information; an image information generation unit configured to generate image information for expressing a three-dimensional image based on the point information corrected by the correction unit; and a display unit configured to display the three-dimensional image based on the image information generated by the image information generation unit.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

FIG. 8 is a table showing a state of point information 81 indicating correspondence between feature point information of each subject and coordinate information thereof.

FIG. 10A is a graph showing a distribution map of feature points, FIG. 10B is a graph showing a distribution map of feature points after correction, FIG. 10C is a graph showing a distribution map of feature points after correction, and FIG. 10D is a graph showing a distribution map of feature points obtained by correction according to a modification.

FIG. 11A is a table showing a state of point information 82 corrected by processing in step SC4, and FIG. 11B is a table showing a state of point information 83 corrected by processing in step SC7.

FIG. 17 is a flow chart showing the contents of a distance information correction process according to a third embodiment of the invention.

FIG. 21 is a table showing a state of point information 84 corrected by processing in step SG3.

DETAILED DESCRIPTION

Figure 1:
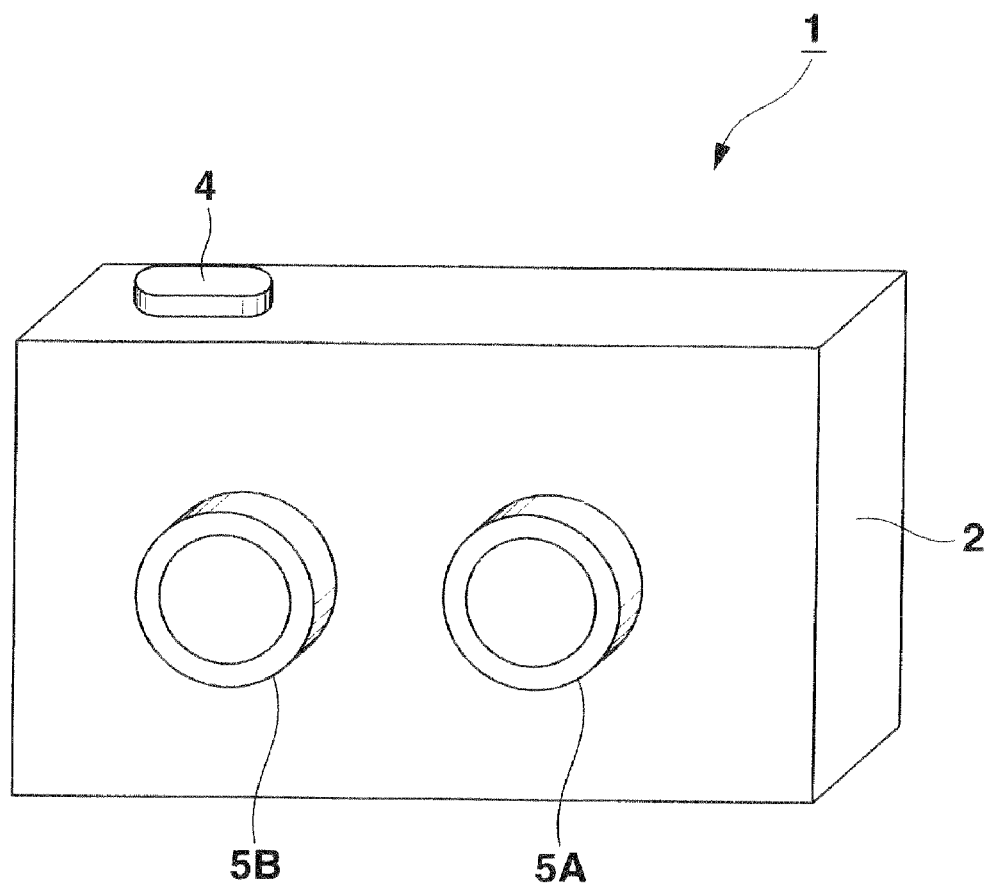
FIG. 1 is a view of external appearance of a digital camera 1 according to a first embodiment of the invention.

The embodiments according to the present invention will be described in detail with reference to the accompanying drawings. The scope of the claimed invention should not be limited to the examples illustrated in the drawings and those described below.

First Embodiment

A first embodiment of the invention will be described below with reference to the drawings.

FIG. 1 is a view of external appearance of a digital camera 1 according to the first embodiment. A shutter key 4 is provided in a top face of a body 2 of the digital camera 1. An optical lens device 5A and an optical lens device 5B are provided in a front face of the body 2 of the digital camera 1.

The shutter key 4 has a so-called half press shutter function, in which the shutter key 4 may be pressed halfway, and is formed so as to be capable of performing a half press operation for focusing and a full press operation for an image capture instruction (i.e., for recording instruction of a photographic image data).

The optical lens devices 5A and 5B are disposed so that the optical axis of the optical lens device 5A is at a distance g (mm) from the optical axis of the optical lens device 5B.

Figure 2:
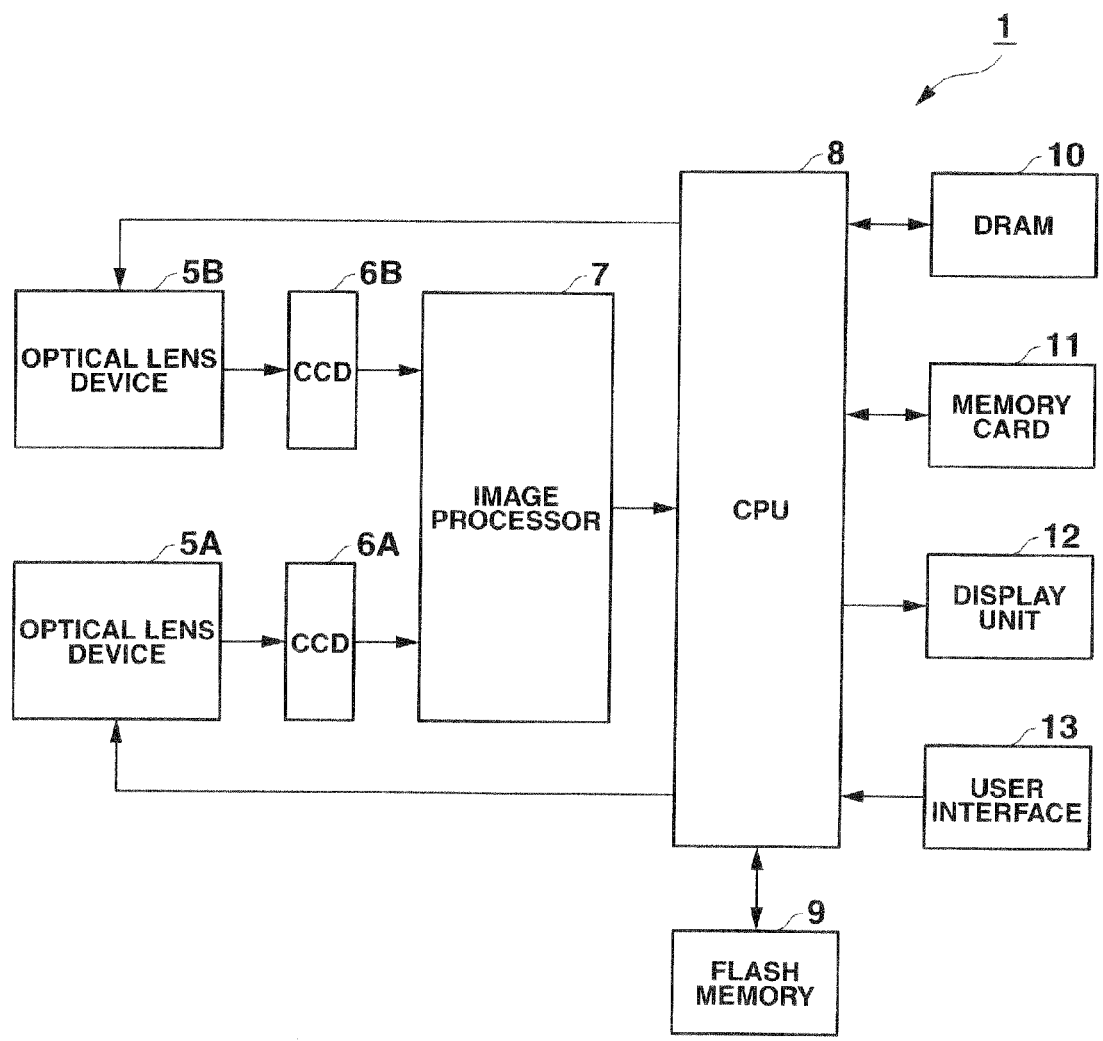
FIG. 2 is a block diagram showing the electrical configuration of the digital camera 1.

FIG. 2 is a block diagram showing respective functions of components provided in the digital camera 1. The electrical configuration of the digital camera 1 will be described with reference to FIG. 2.

The digital camera 1 has a CPU 8 as a central component, which controls other components provided in the digital camera 1. The optical lens devices 5A and 5B are connected to the CPU 8. A CCD 6A is connected to the optical lens device 5A. A CCD 6B is connected to the optical lens device 5B. An image processor 7 is connected to the CCDs 6A and 6B. The image processor 7, a memory card 11, a DRAM 10, a flash memory 9, a display unit 12 and a user interface 13 are connected to the CPU 8.

Each of the optical lens devices 5A and 5B is a device which forms an optical image of a subject. Each of the optical lens devices 5A and 5B has an image capturing lens, which is not shown, and a actuator mechanism, which is also not shown, for actuating the image capturing lens. The image capturing lens has a focus lens and a zoom lens. The respective optical axes of the optical lens devices 5A and 5B are set to be parallel with each other. The configuration of the optical lens device 5B is the same as that of the optical lens device 5A. For this reason, the focal length of each of the optical lens devices 5A and 5B is f (mm).

The CCD 6A is an image pick-up device which generates an image pick-up signal by photoelectrically converting an optical image of a subject formed by the optical lens device 5A. The CCD 6A is disposed so that the center of an image pick-up surface of the CCD 6A is on the optical axis of the optical lens device 5A. The CCD 6B is an image pick-up device which generates an image pick-up signal by photoelectrically converting an optical image of a subject formed by the optical lens device 5B. The CCD 6B is disposed so that the center of an image pick-up surface of the CCD 6B is on the optical axis of the optical lens device 5B. The configuration of the CCD 6B is the same as that of the CCD 6A.

The image processor 7 converts the image pick-up signal generated by each of the CCDs 6A and 6B into a digital signal by sampling the image pick-up signal and removing noise. The image processor 7 performs data processing such as luminance signal processing etc. on the image pick-up signal which has been converted into the digital signal. The image processor 7 generates photographic image data of Y (luminance signal), Cb (blue color difference signal) and Cr (red color difference signal) by performing color processing such as color separation on the digital signal which has been subjected to luminance signal processing etc. The image processor 7 further performs various kinds of image processing such as compression of photographic image data and expansion of compressed photographic image data.

The CPU (central processing unit) 8 controls overall components of the digital camera 1. The CPU 8 cooperates with programs stored in the flash memory 9 while using the DRAM 10 as a work memory.

Programs and data necessary for the CPU 8 to perform AF control, AE control, etc. of the digital camera 1 are stored in the flash memory 9. Programs and data (information of the aforementioned distance g, focal length f, diameter c of an acceptable circle of confusion, etc.) for executing control shown in the following flow chart are stored in the flash memory 9. Photographic image data can be also recorded on the flash memory 9.

The DRAM 10 is used as a buffer memory for temporarily storing photographic image data taken successively. The DRAM 10 is used also as a work memory which is used when the CPU 8 executes processing.

The memory card 11 is a recording medium on which respective pieces of photographic image data generated based on subject image signals picked up by the CCDs 6A and 6B are recorded when an image capture instruction is issued. The memory card 11 is detachably connected to the body 2 of the digital camera 1.

The display unit 12 has a liquid crystal display not shown, and a driver circuit for driving the liquid crystal display. When the digital camera 1 stands ready to capture an image, the display unit 12 displays a subject image picked up by the CCD 6A as a live view image on the liquid crystal display. When the digital camera 1 plays back photographic image data, the display unit 12 displays an image based on the photographic image data read from the memory card 11 on the liquid crystal display. The display unit 12 further has a touch panel function.

The user interface 13 has the shutter key 4, and a plurality of not-shown operation keys such as a mode key, a SET key, a cross key, an image capture mode key, etc. The user interface 13 sends an operation signal corresponding to the user's key operation to the CPU 8.

Figure 3:
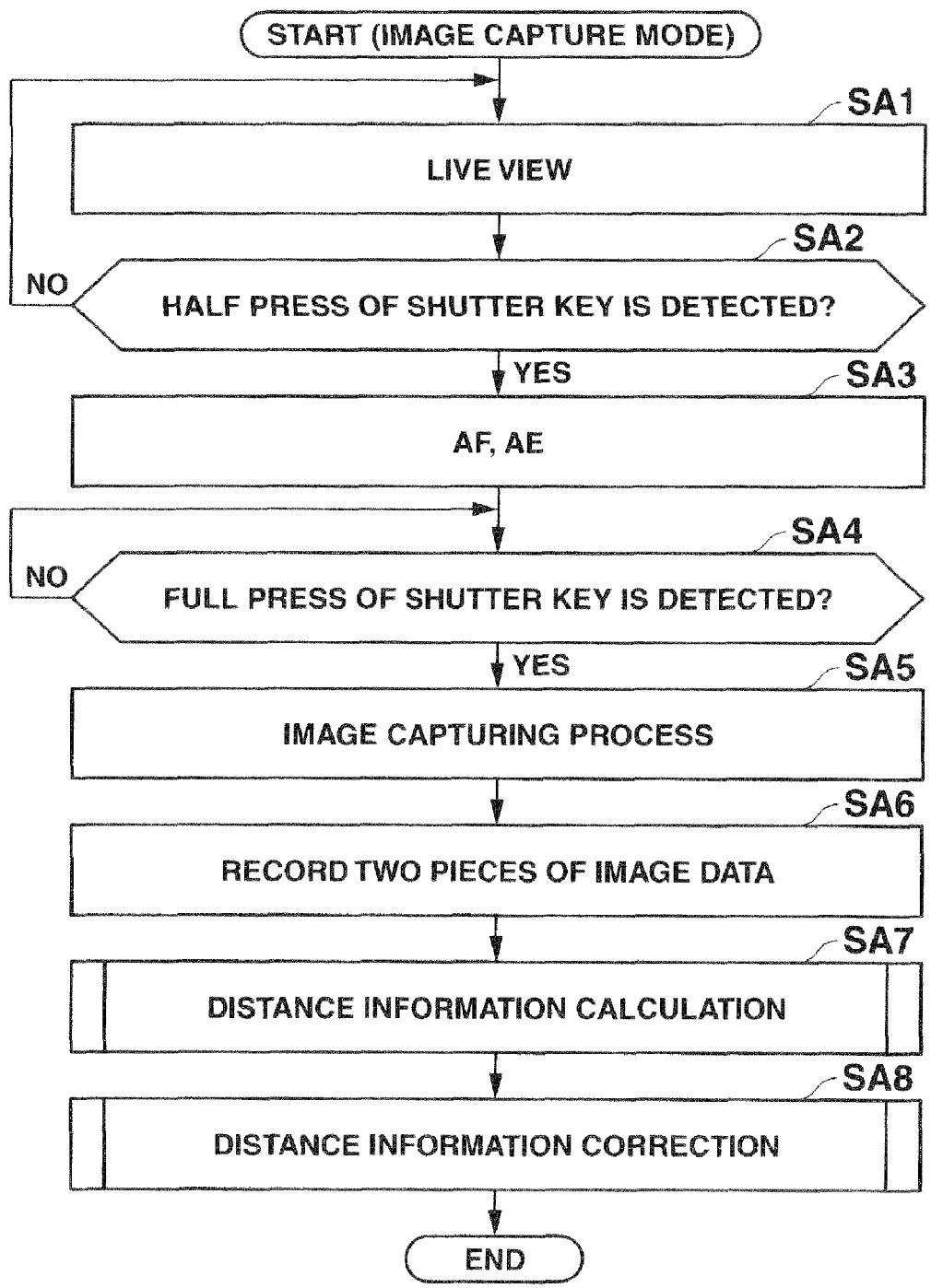
FIG. 3 is a flow chart showing the contents of processing in an image capture mode.

The operation of the digital camera 1 according to this embodiment will be described with reference to FIG. 3. When the user sets the image capture mode by performing a predetermined operation on the user interface 13, the CPU 8 executes processing of the image capture mode shown in the flow chart of FIG. 3 in cooperation with programs read from the flash memory 9 and expanded on the DRAM 10.

Figure 4A:
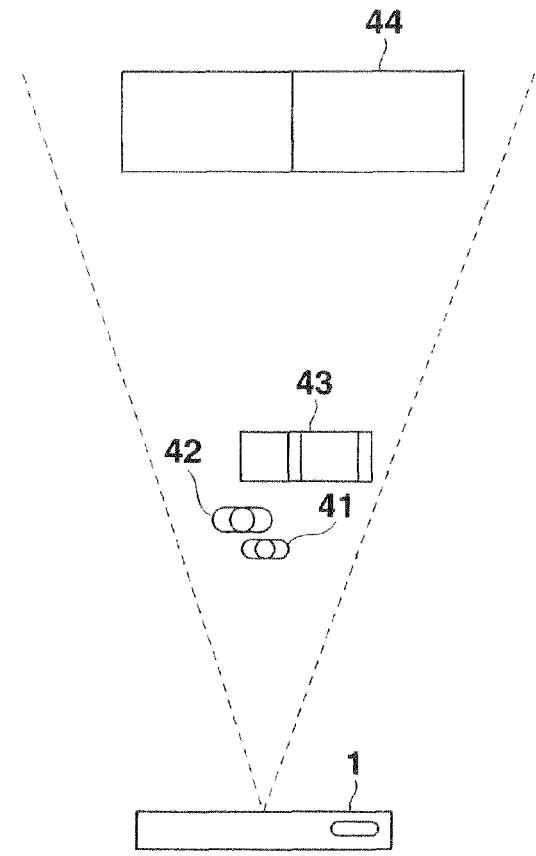
FIG. 4A is a top view of the digital camera 1 and respective subjects.
Figure 4B:
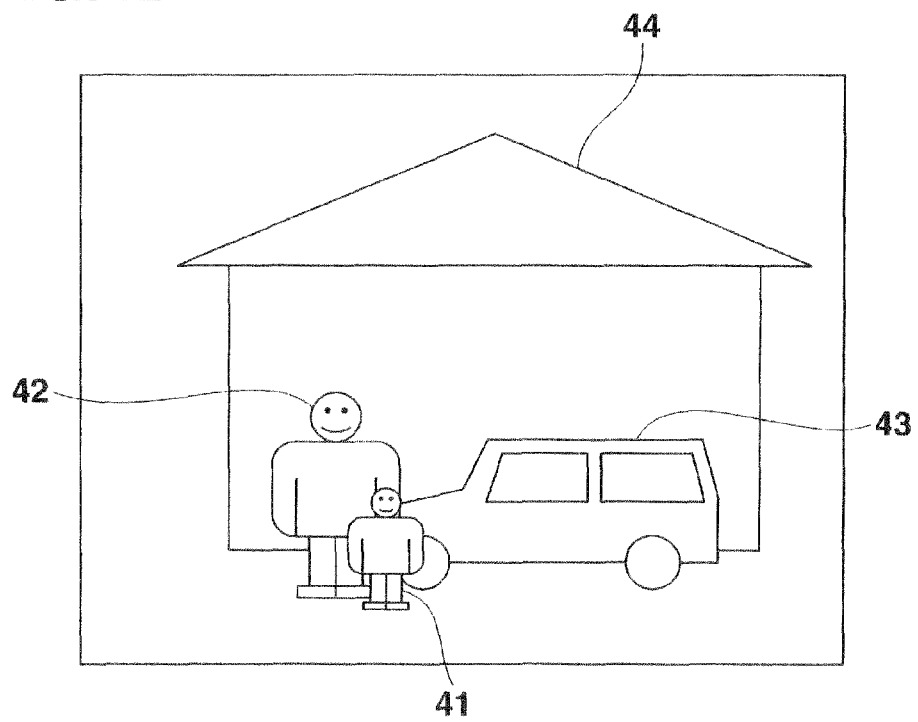
FIG. 4B is a view showing a state of a subject image which can be captured by the digital camera 1.

The image capturing situation in this embodiment will be described with reference to FIGS. 4A and 4B. FIG. 4A is a top view of the digital camera 1 and respective subjects. As shown in FIG. 4A, it is assumed that the digital camera 1 and persons 41 and 42, a car 43 and a building 44 as subjects are present in the image capturing location in this embodiment. The person 41, the person 42, the car 43 and the building 44 are arranged in this order to have shorter distance from the digital camera 1. FIG. 4B shows a state of a subject image which can be caught by the digital camera 1.

Referring back to FIG. 3, description will be continued. When the image capture mode is set, the CPU 8 starts processing to display photographic image data picked up by the CCD 6A and stored in the DRAM 10 successively, as a live view image, on the display unit 12 (step SA1).

Then, the CPU 8 stands ready to determine whether the shutter key 4 has been half-pressed or not (step SA2). When the CPU 8 cannot detect the half-press of the shutter key 4 on this occasion (step SA2; NO), processing is returned to the step SA1 so that the live view image is displayed continuously. On the other hand, when the shutter key 4 is half-pressed by the user, the CPU 8 detects an operation signal corresponding to the half press operation to thereby determine that the shutter key 4 has been half-pressed (step SA2; YES).

Then, the CPU 8 performs focus adjustment based on ordinary AF control immediately. That is, the CPU 8 adjusts ISO sensitivity and shutter speed based on ordinary AE control (so-called program AE control) while executing focusing for the focus areas of central regions in respective image capture ranges of the CCDs 6A and 6B (step SA3).

Then, the CPU 8 stands ready to determine whether the shutter key 4 has been full-pressed or not (step SA4). When the CPU 8 cannot detect the full press of the shutter key 4 on this occasion (step SA4; NO), the CPU 8 remains standing ready. On the other hand, when the shutter key 4 is full-pressed by the user, the CPU 8 detects an operation signal corresponding to the full press operation to thereby determine that the shutter key 4 has been full-pressed (step SA4; YES).

Then, the CPU 8 generates two photographic image data 50A and 50B by immediately executing photographic processing on respective subject image signals stored in the CCDs 6A and 6B and compresses the two generated photographic image data 50A and 50B in JPEG format (step SA5).

Figure 5A:
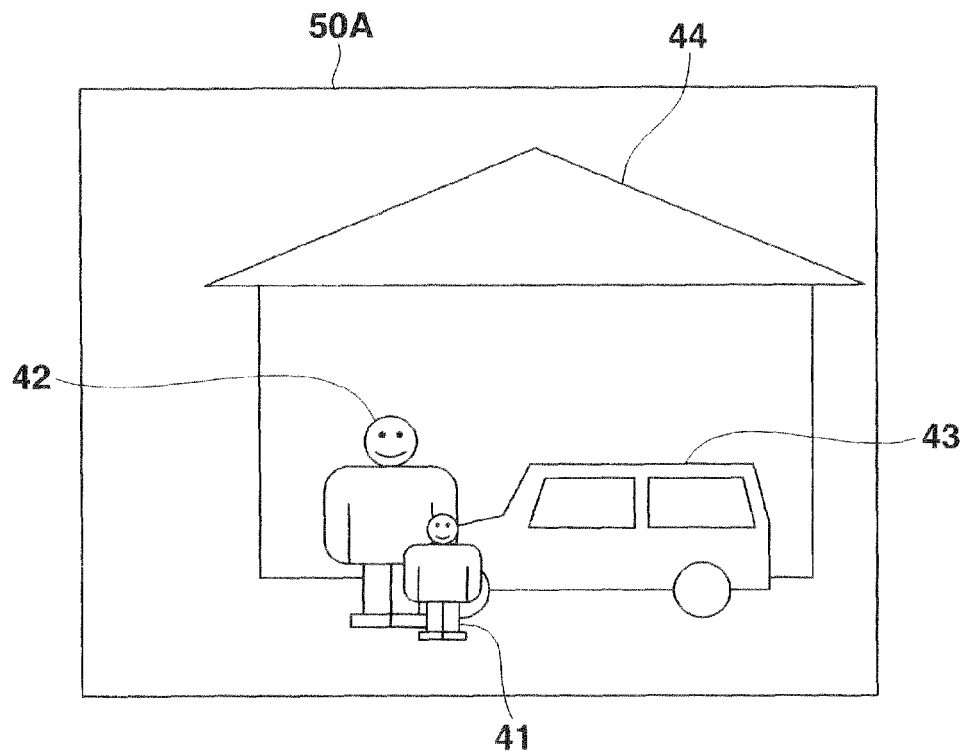
FIG. 5A is a view showing a photographic image picked up by a CCD 6A.
Figure 5B:
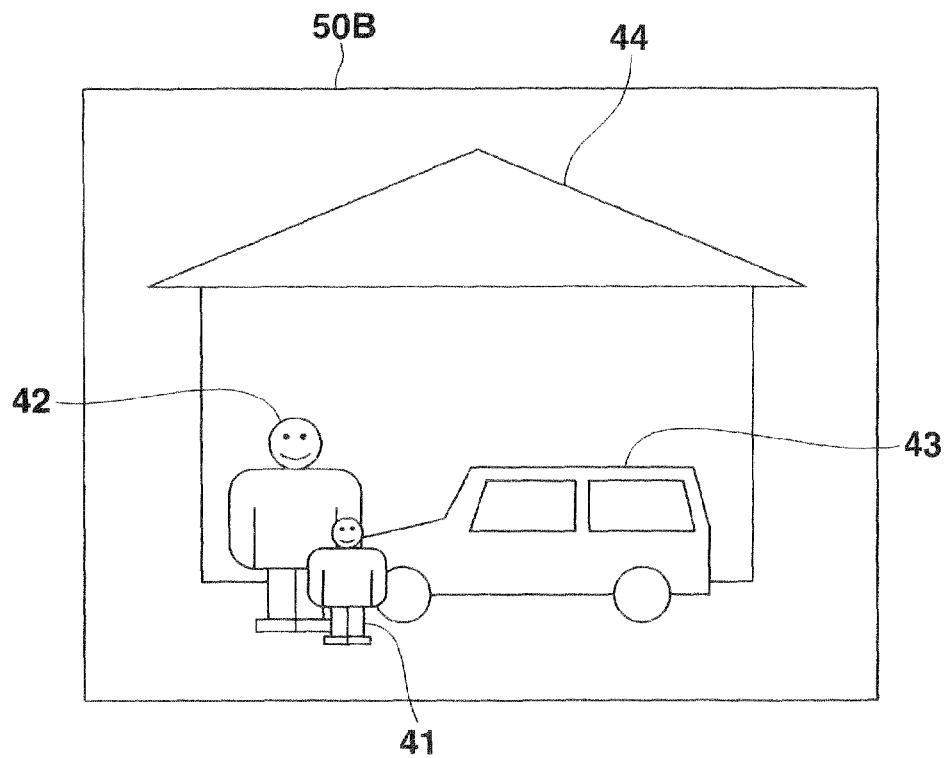
FIG. 5B is a view showing a photographic image picked up by a CCD 6B.

FIG. 5A shows a photographic image expressed by the photographic image data 50A (i.e. a photographic image picked up by the CCD 6A). FIG. 5B shows a photographic image expressed by the photographic image data 50B (i.e. a photographic image picked up by the CCD 6B).

Since the two photographic images are subject images captured by the optical lens devices 5A and 5B respectively, parallax occurs. For this reason, the position of each subject in the photographic image shown in FIG. 5B is different from the position of the same subject shown in FIG. 5A.

Referring back to FIG. 3, the CPU 8 generates respective header data of the two pieces of photographic image data 50A and 50B, generates two image files each including header data and compressed photographic image data and temporarily records the two generated image files on the memory card 11 (step SA6).

Then, the CPU 8 performs a distance information calculation process (step SA7) and a distance information correction process (step SA8) and terminates processing in the image capture mode. Details of the distance information calculation process in the step SA7 and details of the distance information correction process in the step SA8 will be described later.

Figure 6:
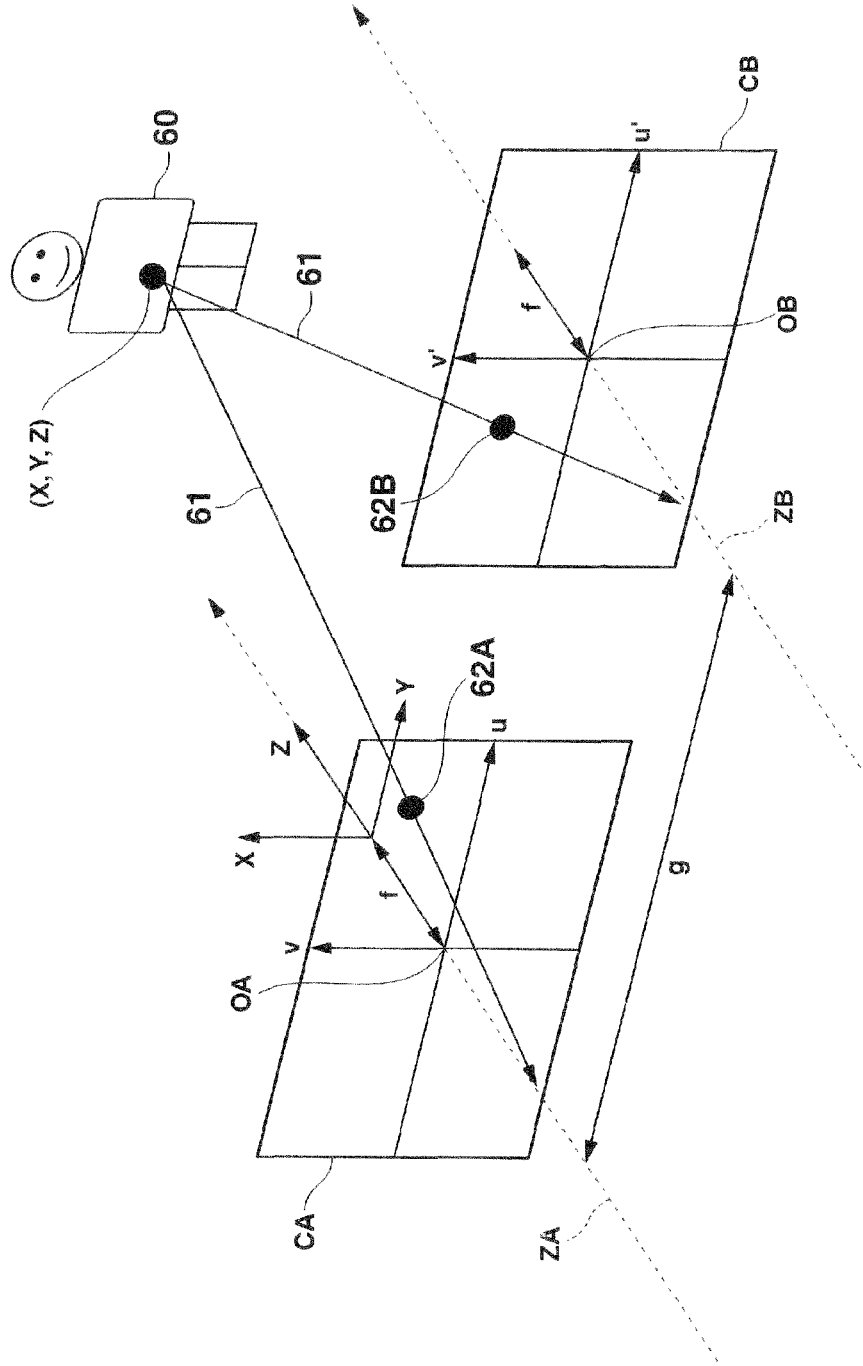
FIG. 6 is a conceptual view for explaining the theory of a stereo vision.

The theory of a stereo vision used for the distance information calculation process in the step SA7 will be described with reference to FIG. 6. The stereo vision is a commonly known method in which images of subjects are captured by two or more cameras so that three-dimensional information is obtained based on positional differences between the subjects in respective images by use of the theory of triangulation. FIG. 6 is a conceptual view for explaining the theory of the stereo vision.

In FIG. 6, OA is the position where the center of the image pick-up surface (photo acceptance surface) of the CCD 6A is present in a real space whereas OB is the position where the center of the image pick-up surface (photo acceptance surface) of the CCD 6B is present in the real space. ZA is the optical axis of the optical lens device 5A whereas ZB is the optical axis of the optical lens device 5B. As described above, the optical axes ZA and ZB are parallel with each other. The distance between the optical axes ZA and ZB is g (mm).

A coordinate plane CA defines coordinates on the image pick-up surface of the CCD 6A. The coordinate plane CA is orthogonal to the optical axis ZA. The origin OA of the coordinate plane CA is disposed on the optical axis ZA. The coordinate plane CA is defined by a u axis expressing a horizontal direction and a v axis expressing a vertical direction. The coordinates of any point on the coordinate plane CA are (u, v).

A coordinate plane CB defines coordinates on the image pick-up surface of the CCD 6B. The coordinate plane CB is orthogonal to the optical axis ZB. The origin OB of the coordinate plane CB is disposed on the optical axis ZB. The coordinate plane CB is defined by a u' axis expressing a horizontal direction and a v' axis expressing a vertical direction. The coordinates of any point on the coordinate plane CB are expressed as (u', v').

Assume now the case where a subject 60 is present at a point distant from the CCDs 6A and 6B as shown in FIG. 6. Assume that the coordinates of the position of the subject 60 in the real space are (X, Y, Z). Assume that optical images 61 from the subject 60 are accepted by the CCD 6A in a position 62A expressed by the coordinates (u, v) on the coordinate plane CA and by the CCD 6B in a position 62B expressed by the coordinates (u', v') on the coordinate plane CB.

Then, it is known that respective values of the coordinates (X, Y, Z) of the subject 60 in the real space are given by the following expressions (1).

$$\left.\begin{aligned} X &= g \cdot u / (u - u') \\ Y &= g \cdot v / (u - u') \\ Z &= g \cdot f / (u - u') \end{aligned}\right\} \quad (1)$$

In the expression (1) shown above, g is the distance between the optical axes ZA and ZB, and f is the focal length of the optical lens device 5A (optical lens device 5B).

A method of obtaining subject's three-dimensional information based on the positional difference of each subject in two images captured by the two CCDs 6A and 6B respectively in this manner is the stereo vision.

Figure 7:
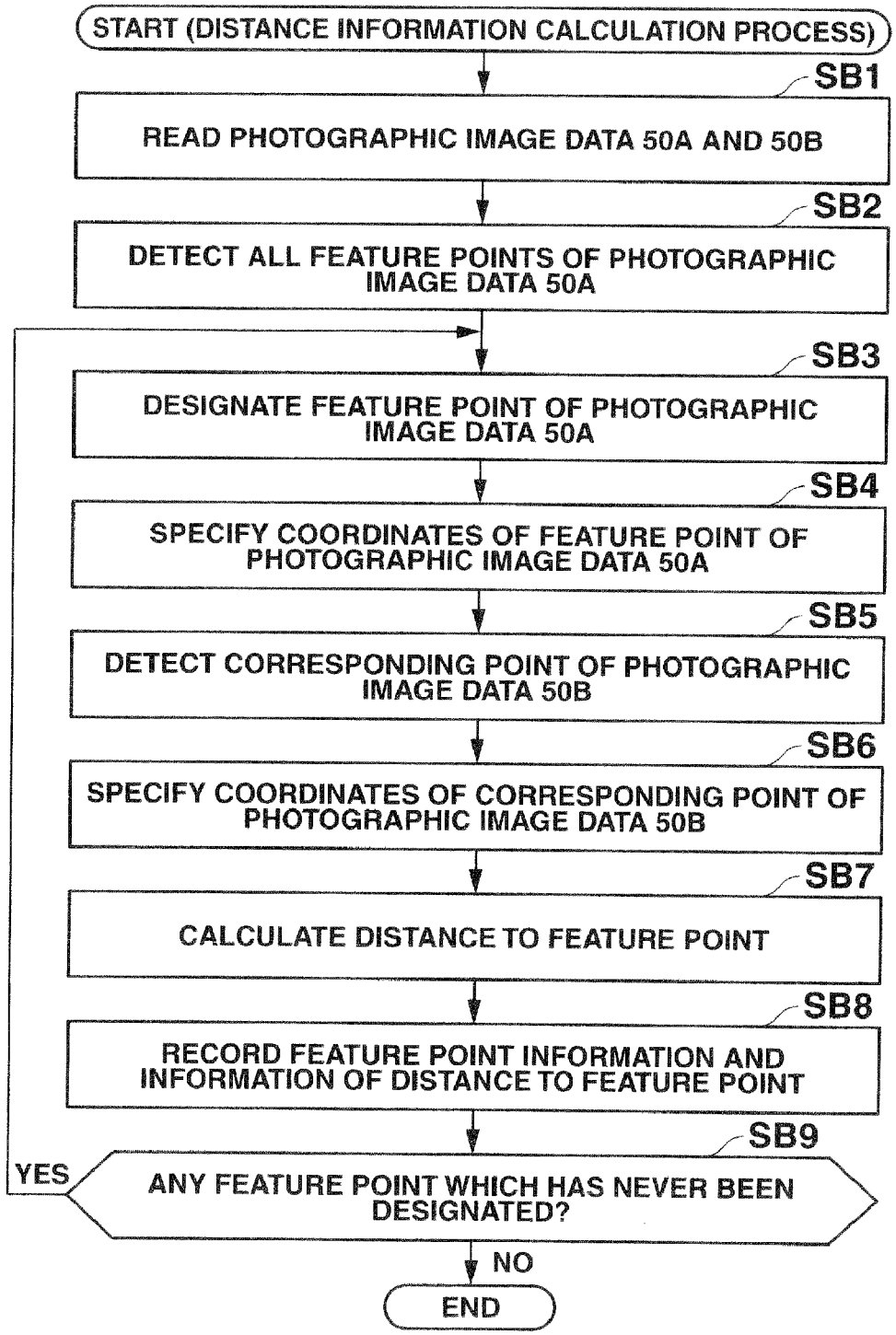
FIG. 7 is a flow chart showing the contents of processing in a distance information calculation process according to this embodiment.

The detailed contents of the distance information calculation process in the step SA7 will be described next with reference to a flow chart shown in FIG. 7. In this embodiment, the distance between each subject and the digital camera 1 at the capturing time is calculated by processing in the step SA7 by use of the theory of the stereo vision.

After processing in the step SA6, the CPU 8 reads the photographic image data 50A and 50B recorded on the memory card and retains these read photographic image data on the DRAM 10 (step SB1).

Then, the CPU 8 detects all feature points in the photographic image expressed by the photographic image data 50A retained in the DRAM 10 (i.e. the photographic image shown in FIG. 5A) and retains image data expressing the detected feature points on the DRAM 10 (step SB2). Each 'feature point' is a region which can be differentiated from other regions because the region is higher in color or luminance than ambient regions. For example, the eye or mouth region of a person in a photographic image can be used as a feature point.

Then, the CPU 8 designates one feature point which has never been designated, from all the feature points detected from the photographic image expressed by the photographic image data 50A (step SB3).

Then, the CPU 8 specifies coordinates (u, v) on the image data 50A, of the feature point designated by processing in the step SB3 and retains the coordinates of the specified feature point on the DRAM 10 (step SB4).

Then, the CPU 8 detects a feature point (corresponding point) on the photographic image data 50B, corresponding to the coordinates (u, v) of the feature point specified by processing in the step SB4 (step SB5). Specifically, the CPU 8 extracts image data expressing the feature point designated by processing in the step SB3, as a template image. The CPU 8 then scans the template image on the photographic image data 50B. The CPU 8 calculates correlation between the photographic image data 50B and the template image and detects a region highest in correlation (coincidence) as a corresponding point on the photographic image data 50, that is, as a point on the photographic image data 50B, corresponding to the feature point on the photographic image data 50A.

Then, the CPU 8 specifies coordinates (u', v') of the corresponding point detected by processing in the step SB5 and retains the coordinates of the specified feature point on the DRAM 10 (step SB6).

Then, the CPU 8 calculates coordinates (X, Y, Z) in the real space, of the feature point designated by processing in the step SB3 (step SB7). Specifically, the CPU 8 calculates the coordinates (X, Y, Z) in the real space, of the feature point designated by processing in the step SB3, in accordance with the aforementioned expressions (1) by using the respective values u, v, u' and v' of the coordinates of the feature point and the corresponding point retained in the DRAM 10 and the distance information g between the optical lens devices 5A and 5B and the focal length information f recorded on the flash memory 9 in advance.

Then, the CPU 8 retains point information 81 expressing correspondence between the feature point information designated by processing in the step SB3 and the coordinate information of the feature point calculated by processing in the step SB8, on the DRAM 10 (step SB8).

Then, the CPU 8 determines whether or not there is any feature point which has never been designated by processing in the step SB3 (step SB9). When the CPU 8 determines that there is any feature point which has never been designated by processing in the step SB3, the CPU 8 returns processing to the step SB3 (step SB9; YES).

When processing is returned to the step SB3, the CPU 8 repeats respective processing of the steps SB3 to SB8 so that coordinates of any non-designated feature point in the real space are calculated and recorded. In this manner, the CPU 8 calculates coordinates in the real space, of all the feature points detected by processing in the step SB2.

FIG. 8 shows a state of the point information 81 indicating correspondence between feature point information of each subject and coordinate information of the subject's feature points. As shown in FIG. 8, for example, coordinates (X, Y, Z) corresponding to a feature point 1 of a person 41 are 0.05 (m), 0.10 (m) and 2.00 (m).

When designation of all the feature points is completed, the CPU 8 determines that there is no feature point which has never been designated (step SB9; NO), and terminates the distance information calculation process shown in the flow chart of FIG. 7.

The detailed contents of the distance information correction process in the step SA8 will be described next with reference to a flow chart shown in FIG. 9.

After processing in the step SA7, the CPU 8 generates distance-specific feature point information indicating correspondence between each piece of distance information and the number of feature points corresponding to the same distance information, by using the point information 81 retained in the DRAM 10 (step SC1).

In this embodiment, the value of the Z coordinate in the coordinates (X, Y, Z) in the real space, of each feature point calculated by processing in the step SA7 is used as distance information for generating the distance-specific feature point information. The CPU 8 specifies all pieces of distance information (values of Z coordinates) corresponding to the respective feature points and calculates feature point number information corresponding to each piece of distance information. The CPU 8 then plots points indicating the feature point number information calculated in accordance with each piece of distance information, on a coordinate plane to thereby create a distribution map of feature points as distance-specific feature point information.

FIG. 10A shows a distribution map of feature points generated by the CPU 8. In the distribution map of feature points shown in FIG. 10A, the horizontal axis indicates distance from the digital camera 1 to each of regions of existence of feature points of subjects in the real space, and the vertical axis indicates the number of feature points of a subject which exist in each distance. In FIG. 10A, the direction of the vertical axis is upward and the direction of the horizontal axis is rightward.

A distribution curve 90 (represented by a thick solid line curve) is shown in the distribution map of feature points in FIG. 10A. The distribution curve 90 is formed in such a manner that plotted points indicating feature point number information corresponding to respective pieces of distance information are connected.

Three peak portions 91, 92 and 93 exist on the distribution curve 90. In FIG. 10A, the peak portion 91 indicates existence of feature points of the persons 41 and 42 located in a place at the shortest distance from the digital camera 1 shown in FIG. 4A. The peak portion 92 indicates existence of feature points of the car 43 located in a place next to the persons 41 and 42 and at the second shortest distance from the digital camera 1. The peak portion 93 indicates existence of feature points of the building 44 located in a place at the longest distance from the digital camera 1.

As shown in FIG. 4A, there is no subject (feature point) between the digital camera 1 and the person 41 at the image capturing time. For this reason, as shown in FIG. 10A, there is no distribution curve 90 in a distance range of from the origin to the peak portion 91 (peak indicating existence of feature points of the person 41).

Similarly, as shown in FIG. 4A, there is no subject (feature point) between the car 43 and the building 44 at the image capturing time. For this reason, as shown in FIG. 10A, the values of the distribution curve 90 (the numbers of feature points) are all zero in a range of from the peak portion 92 to the peak portion 93.

Referring back to FIG. 9, the CPU 8 detects a change start point of the distribution curve 90 (step SC2). Specifically, the CPU 8 first successively specifies number information having the minimum value and a plurality of number information having a value close to the minimum value from the distribution curve in ascending order of respective feature point number information. The CPU 8 then specifies all distance information corresponding to the respective specified number information.

In this embodiment, the CPU 8 specifies four pieces of distance information, that is, distance information corresponding to a start point 94 of the distribution curve 90, distance information corresponding to an end point 95 of the peak portion 92, distance information corresponding to a start point of the peak portion 93 and distance information corresponding to an end point of the peak portion 93, as respective pieces of distance information corresponding to the number information having the minimum value and the plurality of pieces of number information having a value close to the minimum value in the respective pieces of feature point number information.

Then, the CPU 8 detects a point corresponding to the shortest distance information as a change start point in the four pieces of specified distance information. In this embodiment, as shown in FIG. 10A, the CPU 8 detects the start point 94 of the distribution curve 90 as a change start point.

Then, the CPU 8 detects a change end point of the distribution curve 90 (step SC3). Specifically, the CPU 8 detects a point corresponding to the second shortest distance information in the four pieces of detected distance information from the distribution curve 90. In this embodiment, as shown in FIG. 10A, the end point 95 of the peak portion 92 is detected as a change end point. In this embodiment, distance information corresponding to the change end point 95 is 4.20 (m).

Then, the CPU 8 corrects the distance information included in the point information 81 retained in the DRAM 10 so that all pieces of distance information belonging to a longer distance range than the distance information corresponding to the change end point 95 are changed to the distance information (4.20 (m)) corresponding to the change end point 95 (step SC4).

By processing in the step SC4, as shown in FIG. 10B, all pieces of distance information corresponding to the peak portion 93 (peak indicating existence of feature points of the building 44) existing after the change end point 95 are corrected to the distance information (4.20 (m)) corresponding to the change end point 95. Consequently, as shown in FIG. 10B, information of the peak portion 93 is corrected to information of a peak portion 931.

FIG. 11A shows a state of point information 82 after correction by processing in the step SC4. The point information 82 after correction as shown in FIG. 11A is different from the original point information 81 shown in FIG. 8 in that all pieces of distance information (values of Z coordinates) corresponding to respective feature points of the building 44 are corrected to 4.20 (m) which is distance information of the change end point 95.

Figure 12:
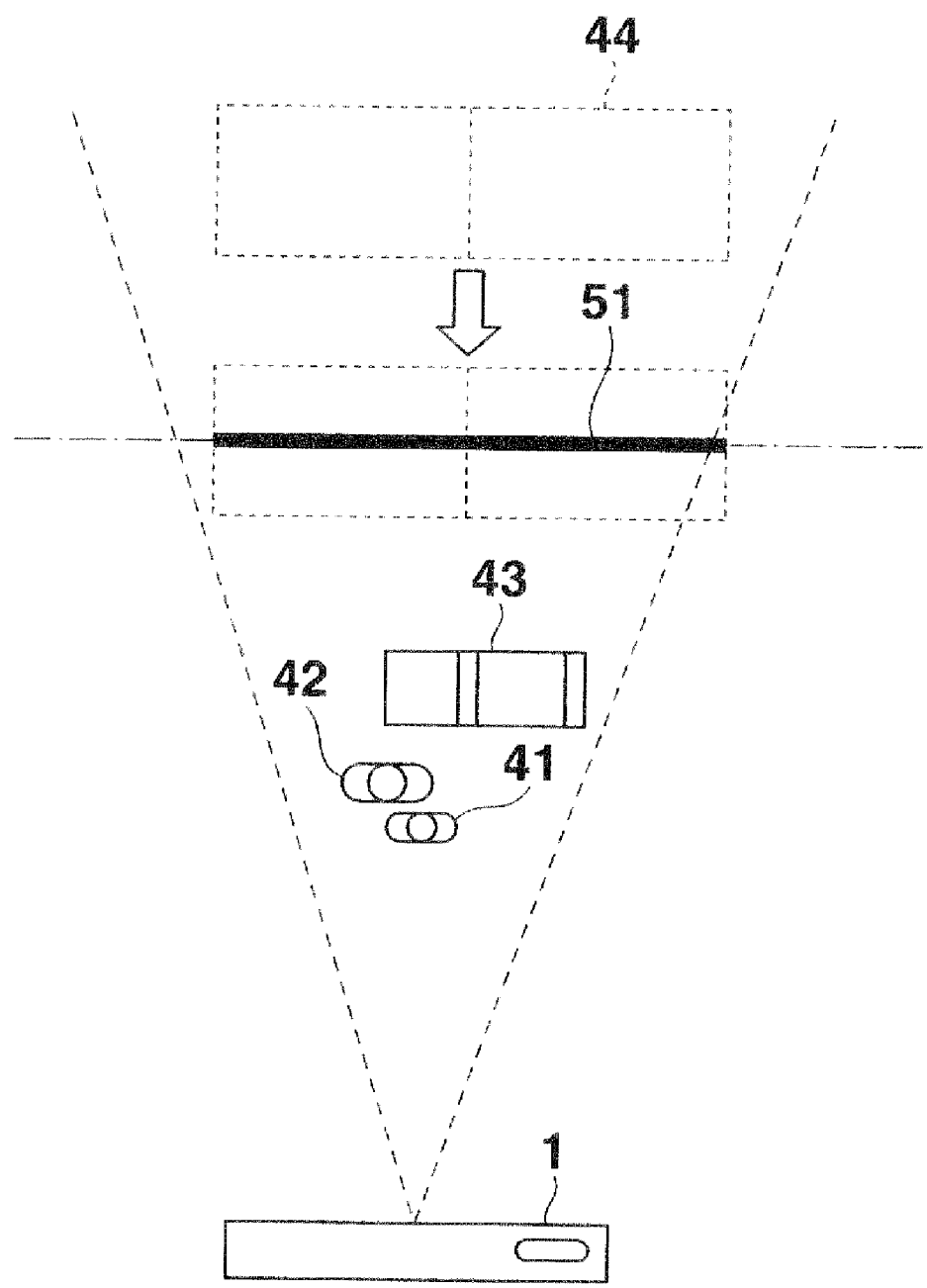
FIG. 12 is a conceptual view showing virtual change of the image capturing environment in accordance with processing in the step SC4.

Processing in the step SC4 will be supplementarily described with reference to FIG. 12. FIG. 12 is a conceptual view showing virtual change of the image capturing environment after processing in the step SC4.

By processing in the step SC4, distance information corresponding to respective feature points of the building 44 in the point information is corrected so as to be reduced. For this reason, as shown in FIG. 12, the virtual image capturing environment based on the point information 82 after correction is formed as if the position of the building 44 approached the position of the digital camera 1.

Respective pieces of distance information corresponding to all feature points of the building 44 in the point information are equalized to distance information corresponding to the change end point 95. For this reason, as shown in FIG. 12, the depth of the building 44 is lost as if the building 44 formed a plane 51.

Referring back to FIG. 9, the CPU 8 sets a distance range of distance information not shorter than distance information of the change start point 94 and not longer than distance information of the change end point 95 as a three-dimensional display distance range following processing in the step SC4 (step SC5). The three-dimensional display distance range is a distance range in which a captured subject image is displayed three-dimensionally in a playback mode which will be described later. FIG. 10B shows the three-dimensional display distance range 96 in this embodiment.

Then, the CPU 8 determines whether the set three-dimensional display distance range 96 is at least a predetermined threshold or not (step SC6). When the set three-dimensional display distance range 96 is smaller than the predetermined threshold (step SC6; NO), the CPU 8 brings processing to step SC8. In this embodiment, it is assumed that the threshold is set to 1 (m). However, the threshold may not be set to 1 (m).

On the other hand, when the set three-dimensional display distance range 96 is not smaller than the predetermined threshold (step SC6; YES), the CPU 8 corrects distance information belonging to the three-dimensional display distance range 96 in the distance information included in the corrected point information 82 so that the three-dimensional display distance range 96 is equalized to a distance range of the threshold (1 (m)) (step SC7).

The CPU 8 calculates the average value of respective pieces of distance information belonging to the three-dimensional display distance range 96 before correction in advance. The CPU 8 then calculates all ratios of difference values between adjacent pieces of distance information on a number line with respect to respective pieces of distance information included in the three-dimensional display distance range 96 before correction in advance.

After such calculation process, the CPU 8 corrects the respective pieces of distance information belonging to the three-dimensional display distance range 96 in the point information 82 so that all pieces of distance information belonging to the three-dimensional display distance range 96 before correction are included in a distance range having the same value as the threshold (1 (m)).

The CPU 8 performs processing in the step SC7 so that the average value of distance information belonging to the three-dimensional display distance range 961 after correction becomes equal to the average value of distance information belonging to the three-dimensional display distance range 96 before correction.

The CPU 8 performs processing in the step SC7 so that the ratio of difference values between adjacent pieces of distance information on a number line in the three-dimensional display distance range 961 after correction becomes equal to the ratio of difference values between adjacent pieces of distance information on a number line in the three-dimensional display distance range 96 before correction.

The CPU 8 performs processing in the step SC7 so that the size relation between the corrected pieces of distance information (respective pieces of distance information belonging to the three-dimensional display distance range 961) is substantially the same as the size relation between the pieces of distance information belonging to the three-dimensional display distance range 96 before correction.

FIG. 10C shows the three-dimensional display distance range 961 corrected by processing in the step SC7. As shown in FIG. 10C, the corrected three-dimensional display distance range 961 is narrower than the three-dimensional display distance range 96 before correction.

FIG. 11B shows point information 83 corrected by processing in the step SC7. As shown in FIG. 11B, distance information (values of Z coordinates) belonging to the corrected three-dimensional display distance range 961, that is, the range of existence on a number line, of respective pieces of distance information (values of Z coordinates) corresponding to respective feature points of the persons 41 and 42 and the car 43 is reduced compared with that before correction.

Figure 9:
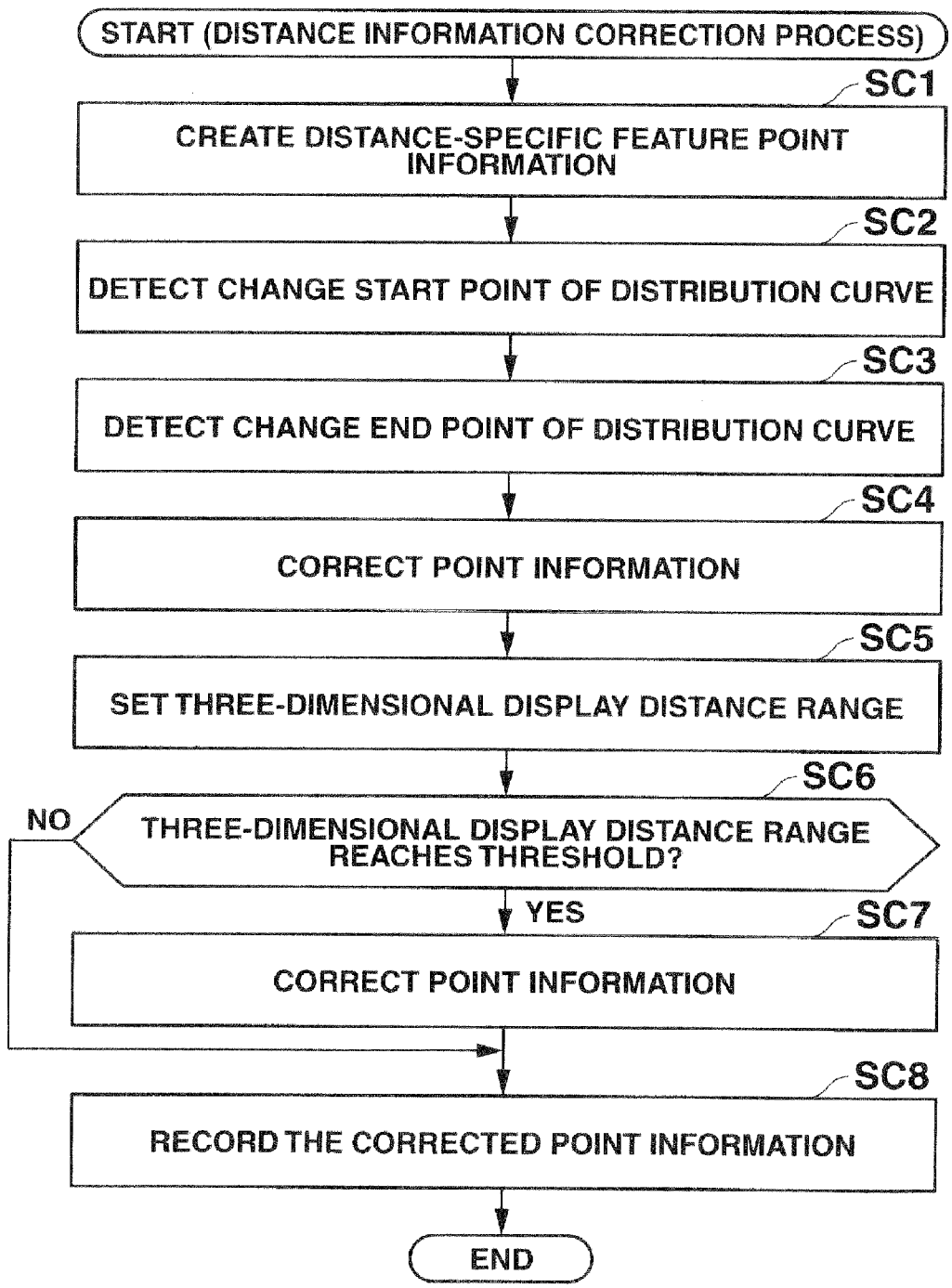
FIG. 9 is a flow chart showing the contents of a distance information correction process according to the first embodiment.

After processing in the step SC6 or processing in the step SC7, the CPU 8 records the corrected point information 82 (or 83) on respective header data of the photographic image data 50A and 50B (step SC8) and terminates the distance information correction process shown in the flow chart of FIG. 9.

Figure 13:
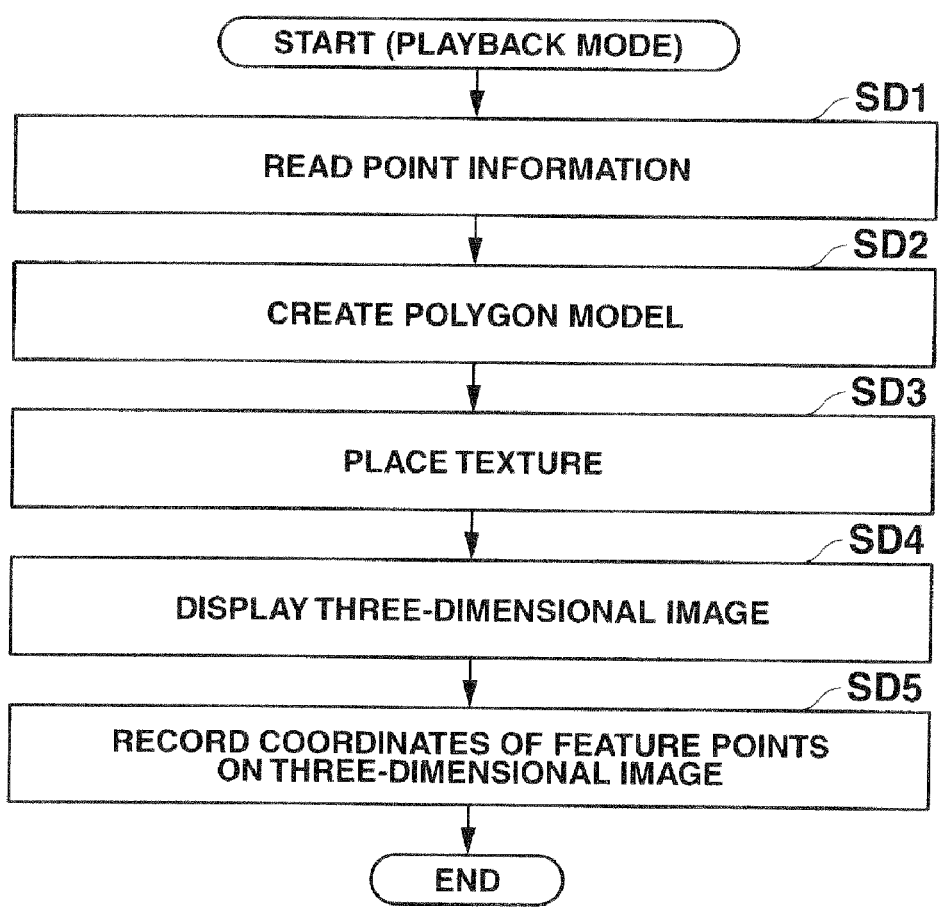
FIG. 13 is a flow chart showing the contents of processing in a playback mode according to this embodiment.

Processing in the playback mode in accordance with this embodiment will be described next with reference to a flowchart shown in FIG. 13. When the user sets the playback mode by performing a predetermined operation on the user interface 13, the CPU 8 executes processing in the playback mode shown in the flow chart of FIG. 13 in corporation with programs read from the flash memory 9 and expanded on the DRAM 10.

When the playback mode is set, the CPU 8 reads point information 82 (or 83) corrected by processing in the step SA8 from the header data attached to the photographic image data and retains the read point information on the DRAM 10 (step SD1).

Then, the CPU 8 generates a triangular polygon model by using the point information read on the DRAM 10 in accordance with a commonly known Delaunay method (step SD2). The triangular polygon model is generated while feature points are connected so preferentially that each triangle to be generated becomes close to an equilateral triangle. Then, the CPU 8 sticks texture data of the generated triangular polygon model by using a commonly known texture mapping method to thereby create a three-dimensional image (step SD3).

Then, the CPU 8 displays the generated three-dimensional image on the display unit 12 (step SD4). Then, the CPU 8 records coordinate information of respective feature points on the generated three-dimensional image, on the respective header data of the photographic image data 50A and 50B (step SD5) and terminates the playback mode shown in the flow chart of FIG. 13.

Figure 14:
FIG. 14 is a view showing an example of a three-dimensional image generated in the first embodiment.
Figure 22:
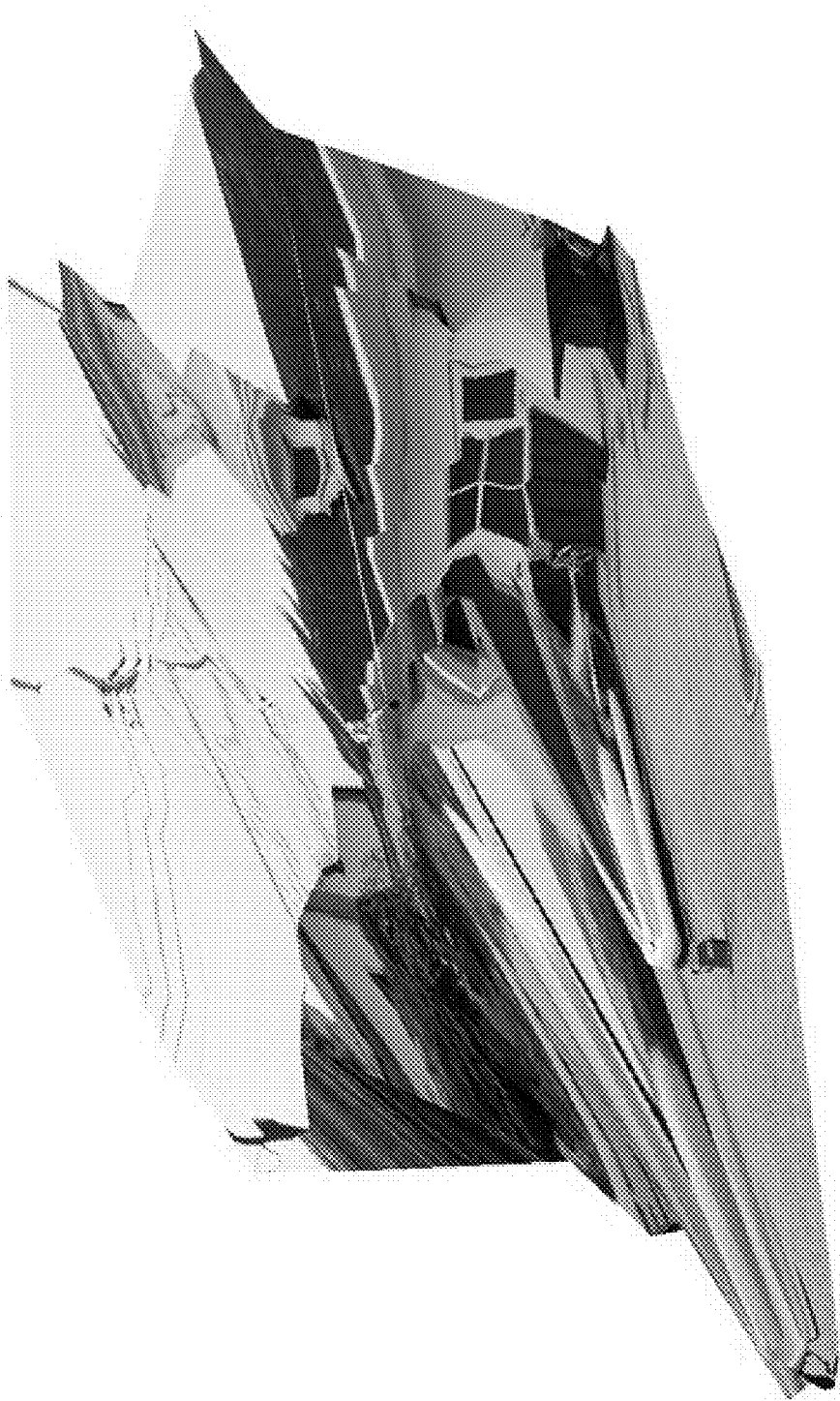
FIG. 22 is a view showing an example of a three-dimensional image generated according to the background art.

FIG. 14 shows an example of the three-dimensional image generated according to this embodiment. The three-dimensional image shown in FIG. 14 and the three-dimensional image shown in FIG. 22 are images captured from the same subject. In the three-dimensional image generated according to this embodiment, the distance between a bronze statue of a horse (a subject in the lower left of the image) as a main subject and a building as the background is reduced compared with the three-dimensional image generated according to the background art shown in FIG. 22. For this reason, the three-dimensional image generated according to this embodiment is an image in which the state of each subject can be grasped easily by the user. This is because distance information longer than the distance information of the change end point in the point information is corrected to be reduced in the distance information correction process in the step SA8 so that the distance information between the subject as the background and the main subject is reduced.

In the three-dimensional image shown in FIG. 14, the bronze statue of a horse as the main subject is expressed three-dimensionally but the building as the background is expressed two-dimensionally. Accordingly, the user can view the shape of the main subject three-dimensionally while the user can grasp the contents of the subject as the background easily. This is because all pieces of distance information longer than the distance information of the change end point in the point information are corrected to the same distance information (as the distance information corresponding to the change end point) in processing in the step SA8 so that all pieces of distance information corresponding to feature points of the background subject in the point information after correction are equalized to the same value.

In the aforementioned first embodiment, the CPU 8 corrects the point information 81 in processing in the step SC4 so that all pieces of distance information longer than the distance information of the change end point 95 are equalized to the same distance information (as the distance information of the change endpoint 95). However, the CPU 8 may perform correction so that pieces of distance information belonging to a range longer than the distance information of the change end point 95 are reduced by the same distance information respectively.

In this modification, for example, as shown in FIG. 10D, the CPU 8 corrects all pieces of distance information included in the point information 81 so that pieces of distance information corresponding to the peak portion 93 are reduced by the difference value between the distance information of the change end point 95 and the distance information corresponding to the start point of the peak portion 93 to thereby make the start point of the peak portion 93 match with the change end point 95.

In the first embodiment, the CPU 8 corrects distance information belonging to the three-dimensional display distance range 96 in distance information included in the point information 82 in processing in the step SC7 so that the three-dimensional display distance range 96 is changed to a distance range having the same value as the predetermined threshold if the set three-dimensional display distance range 96 is not smaller than the predetermined threshold.

However, the CPU 8 may correct all pieces of distance information Z belonging to the three-dimensional display distance range 96 included in the point information 82 in processing in the step SC7, for example, in accordance with the following expression (2).

$$Z'=Z-(A-Z)\cdot\alpha \qquad (2)$$

In the expression (2), Z is the value of distance information before correction (each piece of distance information belonging to the three-dimensional display distance range 96 before correction), Z' is the value of distance information after correction (each piece of distance information belonging to the three-dimensional display distance range 961 after correction), A is the value of distance information corresponding to the change end point 95, and α is any natural number smaller than 1.

As described above, in the first embodiment and modification thereof, the CPU 8 performs correction so that distance information belonging to a distance range longer than the distance information of the change end point 95 in distance information included in the point information 81 is reduced. In this manner, distance information between the main subject and the background subject in the point information is reduced even when subjects are unsuited for three-dimensional expression, that is, when the distance between the main subject and the background subject is long. Accordingly, in the three-dimensional image generated based on the point information, irregular shaping of triangular polygons forming the three-dimensional image can be avoided. As a result, in this embodiment, a three-dimensional image in which the user can grasp the state of each subject easily, that is, a three-dimensional image high in visibility can be obtained even when subjects are unsuited for three-dimensional expression.

In the first embodiment, the CPU 8 performs correction so that all pieces of distance information longer than the distance information of the change end point 95 in distance information included in the point information 81 are equalized to the same distance information (as the distance information of the change end point 95). In this manner, in the three-dimensional image generated based on the corrected point information, for example, the main subject can be expressed three-dimensionally while the background subject can be expressed two-dimensionally. Accordingly, the user can view the shape of the main subject three-dimensionally while the user can grasp the contents of the background subject easily. As a result, a three-dimensional image in which the user can grasp the contents of the background subject image easily, that is, a three-dimensional image high in visibility can be obtained in accordance with this embodiment.

In the first embodiment, the CPU 8 corrects distance information belonging to the three-dimensional display distance range 96 in distance information included in the point information 82 so that the three-dimensional display distance range 96 is narrowed when the three-dimensional display distance range 96 is not smaller than the predetermined threshold. In this manner, even when distance information between feature points belonging to the three-dimensional display distance range 96 is too long, the point information 82 can be corrected so that the distance information between the feature points is reduced. Accordingly, excessive enlargement of each triangular polygon forming the main subject expressed three-dimensionally on the three-dimensional image can be avoided. As a result, in accordance with this embodiment, even when the depth of the main subject or the like is large, the shape of the main subject expressed on the three-dimensional image can be corrected so properly that a three-dimensional image high in visibility can be obtained.

Other embodiments of the invention will be described next. Each of embodiments described below is different from the first embodiment only in the contents of processing in the step SA8 but the same as the first embodiment in the electrical configuration of the digital camera 1 and the contents of processing other than the step SA8.

Second Embodiment

A distance information correction process according to a second embodiment of the invention (processing in the step SA8) will be described with reference to a flow chart shown in FIG. 15.

Figure 16A:
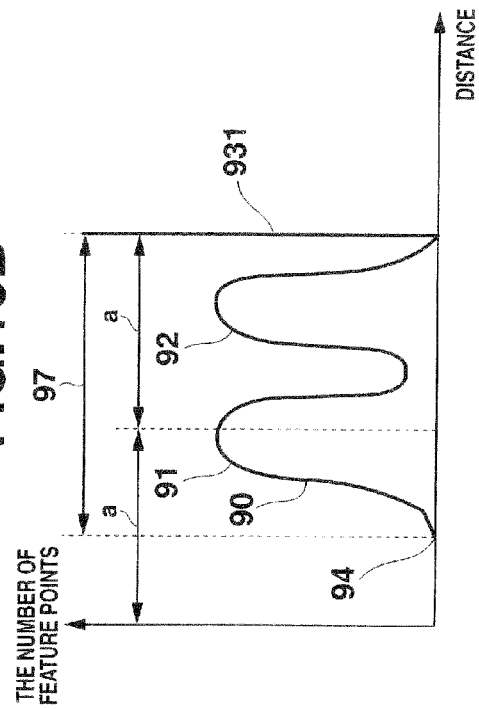
FIG. 16A is a graph showing a distribution map of feature points.

After processing in the step SA7, the CPU 8 generates a distribution map of feature points on the DRAM 10 as distance-specific feature point information by using the point information 81 retained in the DRAM 10 (step SE1). A method of generating the distribution map of feature points is the same as in processing in the step SC1. FIG. 16A shows the distribution map of feature points generated by the CPU 8.

The CPU 8 detects the change start point 94 of the distribution curve 90 in the same manner as in processing in the step SC2 (step SE2). Also in the second embodiment, as shown in FIG. 16A, the start point 94 of the distribution curve 90 is detected as a change start point.

Then, the CPU 8 calculates distance a from the digital camera 1 (image capturing lens) to a focused subject region (focal region) (step SE3). Specifically, the CPU 8 reads focal length information f recorded on the flash memory 9 in advance and specifies a zoom magnification value m from the current position of the zoom lens. Then, the CPU 8 calculates distance a from the image capturing lens to the focal region in accordance with the commonly known following expression (3).

$$1/a + 1/b = 1/a + 1/m \cdot a = 1/f \qquad (3)$$

In the expression (3), a is the distance from the image capturing lens to the focal region, b is the distance from the image capturing lens to a real image, m is the zoom magnification value, and f is the focal length.

Then, the CPU 8 sets distance information of 2a (a is the distance information from the image capturing lens to the focal region) as background aggregate distance information (step SE4). The 'background aggregate distance information' is distance information after point information is corrected by a correction process in step SE5 which will be described later.

Then, the CPU 8 corrects distance information included in the point information 81 retained in the DRAM 10 so that pieces of distance information corresponding to all pieces of feature point information belonging to a range of distance information longer than the background aggregate distance information (2a) are changed to the background aggregate distance information (2a) (step SE5).

Figure 16B:
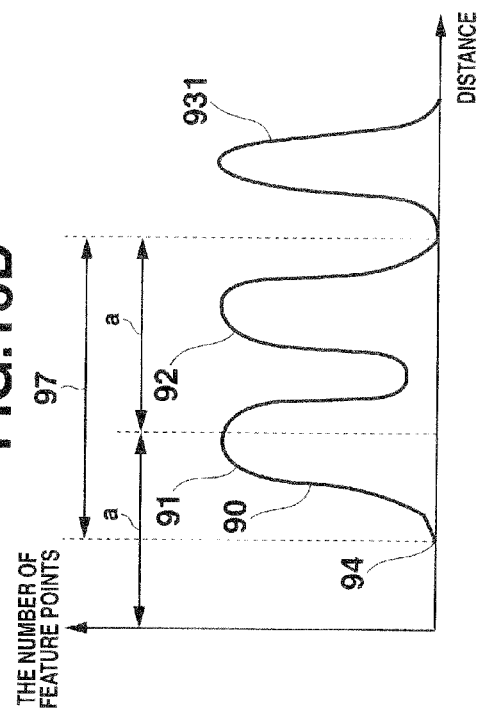
FIG. 16B is a graph showing a distribution map of feature points after correction.

By processing in the step SE5, as shown in FIG. 16B, pieces of distance information corresponding to the peak portion 93 (peak indicating existence of feature points of the building 44) existing in a distance range longer than the background aggregate distance information (2a) are corrected to the background aggregate distance information (2a).

Then, the CPU 8 sets a range of distance information not shorter than the distance information of the change start point and not longer than the background aggregate distance information, as a three-dimensional display distance range (step SE6). FIG. 16B shows the three-dimensional display distance range 97 in this embodiment.

Then, the CPU 8 determines whether the set three-dimensional display distance range 97 is at least a predetermined threshold or not (step SE7). When the set three-dimensional display distance range 97 is smaller than the predetermined threshold (step SE7; NO), the CPU 8 brings processing to step SE9. In this embodiment, the threshold is 1 (m). The threshold need not be 1 (m).

On the other hand, when the three-dimensional display distance range 97 set by processing in the step SE6 is not smaller than the predetermined threshold (step SE7; YES), the CPU 8 corrects distance information belonging to the three-dimensional display distance range 97 in distance information included in the corrected point information so that the three-dimensional display distance range 97 is equalized to a distance range having the same value as the threshold (1 (m)) (step SE8). A method of correcting respective pieces of distance information in processing in the step SE8 is the same as the method of correcting respective pieces of distance information in processing in the step SC7.

Figure 16C:
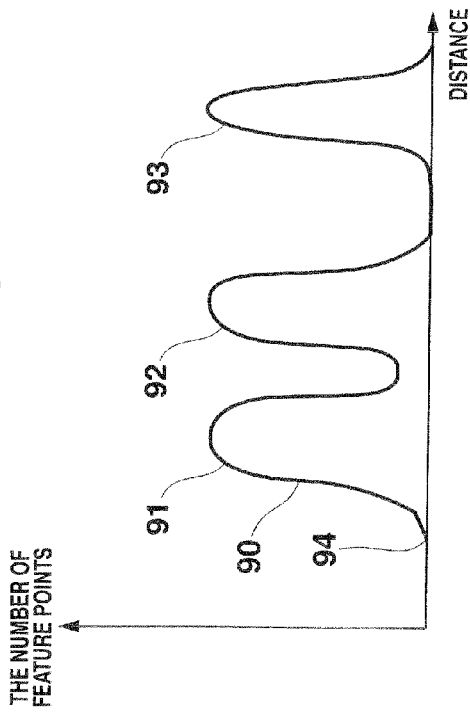
FIG. 16C is a graph showing a distribution map of feature points after correction.

FIG. 16C shows the three-dimensional display distance range 971 corrected by processing in the step SE8. As shown in FIG. 16C, the corrected three-dimensional display distance range 971 is narrower than the three-dimensional display distance range 97 before correction.

Figure 15:
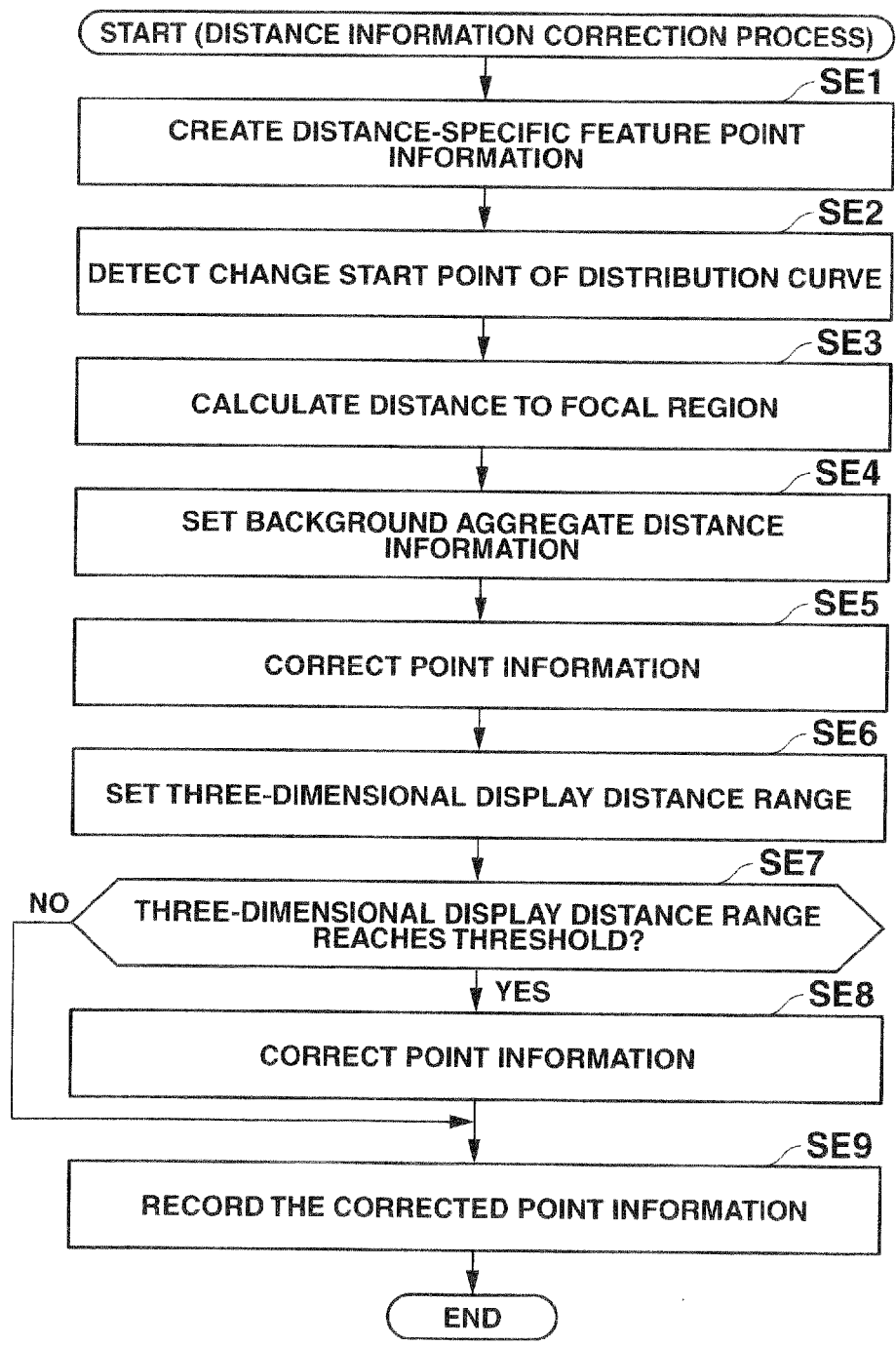
FIG. 15 is a flow chart showing the contents of a distance information correction process according to a second embodiment of the invention.

After processing in the step SE7 or processing in the step SE8, the CPU 8 records the corrected point information on respective header data of the photographic image data 50A and 50B (step SE9) and terminates the distance information correction process shown in the flow chart of FIG. 15.

In the aforementioned second embodiment, the CPU 8 corrects the point information 81 in processing in the step SE5 so that all pieces of distance information longer than the background aggregate distance information are changed to the same distance information (as the distance information of the change end point 95). However, the CPU 8 may perform correction so that pieces of distance information belonging to a range of distance longer than the background aggregate distance information are reduced by the same distance information respectively.

Figure 16D:
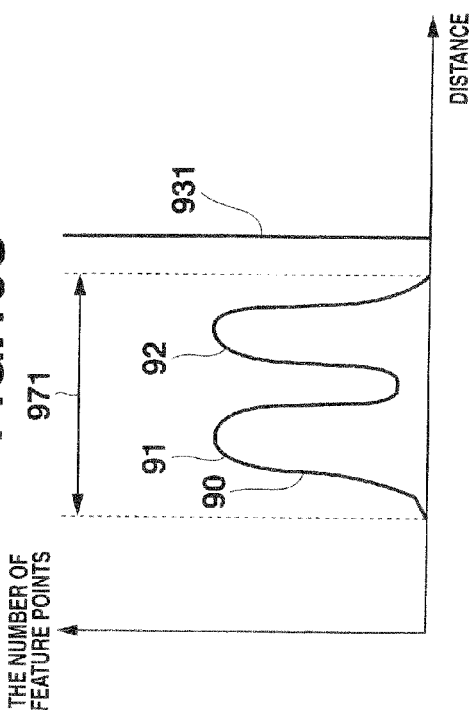
FIG. 16D is a graph showing a distribution map of feature points obtained by correction in a modification.

In this modification, for example, as shown in FIG. 16D, the CPU 8 corrects all pieces of distance information included in the point information 81 so that pieces of distance information corresponding to the peak portion 93 are reduced by the difference value between the background aggregate distance information and the distance information corresponding to the start point of the peak portion 93 to thereby make distance information corresponding to the start point of the peak portion 93 match with the background aggregate distance information (2a).

In the second embodiment, the CPU 8 sets distance information twice as long as the information of distance to the focal region, as the background aggregate distance information. However, the background aggregate distance information may be distance information 1.5 times or three times as long as the information of distance to the focal region.

In the second embodiment, the CPU 8 corrects distance information belonging to the three-dimensional display distance range 97 in distance information included in the point information 82 in processing in the step SE8 so that the three-dimensional display distance range 97 is changed to a distance range having the same value as the predetermined threshold if the set three-dimensional display distance range 97 is not smaller than the predetermined threshold.

However, the CPU 8 may correct all pieces of distance information Z belonging to the three-dimensional display distance range 97 included in the point information in processing in the step SE8, for example, in accordance with the following expression (4).

$$Z'=Z-(2a-Z)\cdot\alpha \quad (4)$$

In expression (4), Z is the value of distance information before correction (each piece of distance information belonging to the three-dimensional display distance range 97 before correction), Z' is the value of distance information after correction (each piece of distance information belonging to the three-dimensional display distance range 971 after correction), 2a is the value of the background aggregate distance information, and $\alpha$ is any natural number smaller than 1.

As described above, in the second embodiment and modification thereof, the CPU 8 performs correction so that distance information belonging to a range of distance longer than the background aggregate distance information in distance information included in the point information 81 is reduced. In this manner, even when, for example, the distance between the main subject and the subject as the background is long, the distance information between the main subject and the background subject in the point information is reduced. Accordingly, in the three-dimensional image generated based on the point information, irregular shaping of triangular polygons forming the three-dimensional image can be avoided. As a result, in this embodiment, a three-dimensional image in which the user can grasp the state of each subject easily, that is, a three-dimensional image high in visibility can be obtained.

In the second embodiment, as shown in FIG. 16B, a distance range near the focal region is set as the three-dimensional display distance range 97 automatically. There is a high possibility that the focused subject will be the main subject catching user's attention. For this reason, in the second embodiment, the main subject catching user's attention can be expressed three-dimensionally easily.

In the second embodiment, the CPU 8 performs correction so that all pieces of distance information longer than the background aggregate distance information in distance information included in the point information 81 are equalized to the same distance information (as the background aggregate distance information). In this manner, in the three-dimensional image generated based on the corrected point information, for example, the main subject can be expressed three-dimensionally while the background subject can be expressed two-dimensionally. Accordingly, the user can view the shape of the main subject three-dimensionally while the user can grasp the contents of the background subject easily. As a result, a three-dimensional image in which the user can grasp the contents of the background subject easily, that is, a three-dimensional image high in visibility can be obtained in accordance with this embodiment.

In the second embodiment, the CPU 8 corrects distance information belonging to the three-dimensional display distance range 97 in distance information included in the point information so that the three-dimensional display distance range 97 is narrowed when the three-dimensional display distance range 97 is not smaller than the predetermined threshold. In this manner, even when distance information between feature points belonging to the three-dimensional display distance range 97 is too long, the point information can be corrected so that the distance information between the feature points is reduced.

Accordingly, excessive enlargement of each triangular polygon forming the main subject expressed three-dimensionally on the three-dimensional image can be avoided. As a result, in accordance with this embodiment, even when the depth of the main subject or the like is large, the shape of the main subject expressed on the three-dimensional image can be corrected so properly that a three-dimensional image high in visibility can be obtained.

Third Embodiment

A distance information correction process according to a third embodiment of the invention (processing in the step SA8) will be described with reference to a flow chart shown in FIG. 17.

Figure 18A:
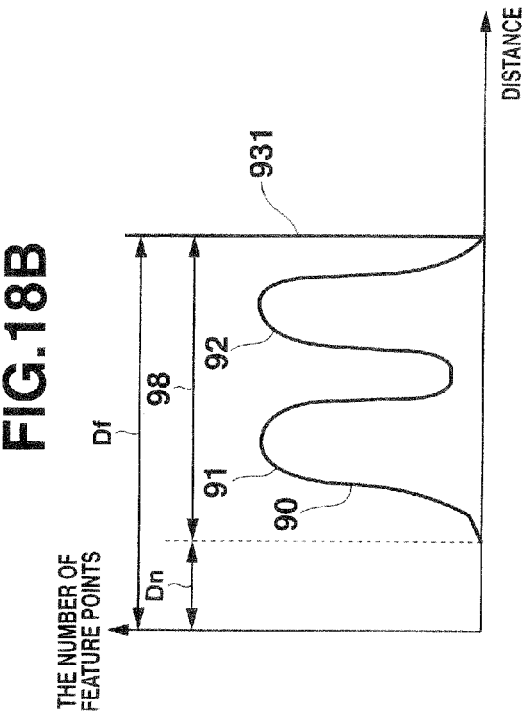
FIG. 18A is a graph showing a distribution map of feature points.

After processing in the step SA7, the CPU 8 generates a distribution map of feature points on the DRAM 10 as distance-specific feature point information by using the point information 81 retained in the DRAM 10 (step SF1). A method of generating the distribution map of feature points is the same as in processing in the step SC1. FIG. 18A shows the distribution map of feature points generated by the CPU 8.

Then, the CPU 8 calculates distance information Dn from the digital camera 1 to a front end of depth of field (step SF2). Specifically, the CPU 8 calculates distance a from the image capturing lens to the focal region in the same manner as in processing in the step SE3, reads focal length information f and diameter information c of an acceptable circle of confusion recorded on the flash memory 9 in advance and specifies the current stop value N. Then, the CPU 8 calculates the distance information Dn to the front end of depth of field in accordance with the commonly known following expression (5).

$$Dn=c\cdot N\cdot a^2/(f^2+c\cdot N/a) \quad (5)$$

In expression (5), a is the distance from the image capturing lens to the focal region, f is the focal length, N is the stop value, and c is the diameter of an acceptable circle of confusion.

Then, the CPU 8 calculates distance information Df from the digital camera 1 to a rear end of depth of field (step SF3). Specifically, the CPU 8 calculates distance a from the image capturing lens to the focal region in the same manner as in processing in the step SE3, reads focal length information f and diameter information c of an acceptable circle of confusion recorded on the flash memory 9 in advance and specifies the current stop value N. Then, the CPU 8 calculates the distance information Df to the rear end of depth of field in accordance with the commonly known following expression (6).

$$Df = c \cdot N \cdot a^2 / (f^2 - c \cdot N/a) \quad (6)$$

In expression (6), a is the distance from the image capturing lens to the focal region, f is the focal length, N is the stop value, and c is the diameter of an acceptable circle of confusion.

Then, the CPU 8 corrects distance information included in the point information 81 retained in the DRAM 10 so that pieces of distance information belonging to a range of distance longer than the distance information Df to the rear end of depth of field are changed to the distance information Df to the rear end of depth of field (step SF4).

Figure 18B:
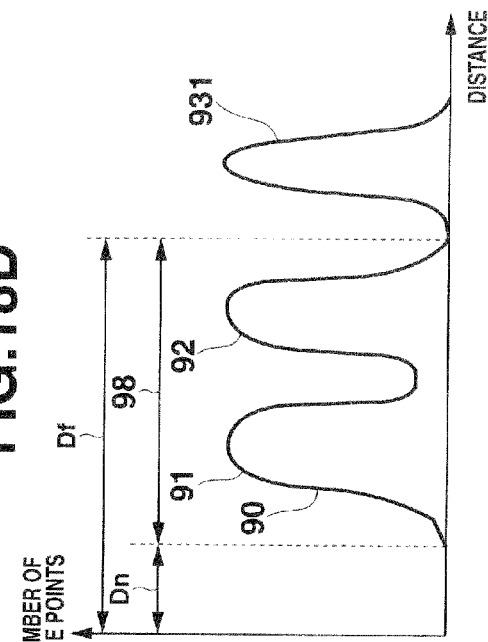
FIG. 18B is a graph showing a distribution map of feature points after correction.

That is, as shown in FIG. 18B, pieces of distance information corresponding to the peak portion 93 (peak indicating existence of feature points of the building 44) belonging to a range of distance longer than the distance information Df to the rear end of depth of field are corrected to the distance information Df to the rear end of depth of field.

Then, the CPU 8 sets a range of distance information not shorter than the distance information Dn of the front end of depth of field and not longer than the distance information Df of the rear end of depth of field, as a three-dimensional display distance range (step SF5). FIG. 18B shows the three-dimensional display distance range 98 in this embodiment.

Then, the CPU 8 determines whether the set three-dimensional display distance range 98 is at least a predetermined threshold or not (step SF6). When the set three-dimensional display distance range 98 is smaller than the predetermined threshold (step SF6; NO), the CPU 8 brings processing to step SF8. In this embodiment, it is assumed that the threshold is set to 1 (m). However, the threshold may not be set to 1 (m).

On the other hand, when the three-dimensional display distance range 98 set by processing in the step SF5 is not smaller than the predetermined threshold (step SF6; YES), the CPU 8 corrects distance information belonging to the three-dimensional display distance range 98 in distance information included in the corrected point information so that the three-dimensional display distance range 98 is equalized to a distance range having the same value as the threshold (1 (m)) (step SF7). A method of correcting respective pieces of distance information in processing in the step SF7 is the same as the method of correcting respective pieces of distance information in processing in the step SC7.

Figure 18C:
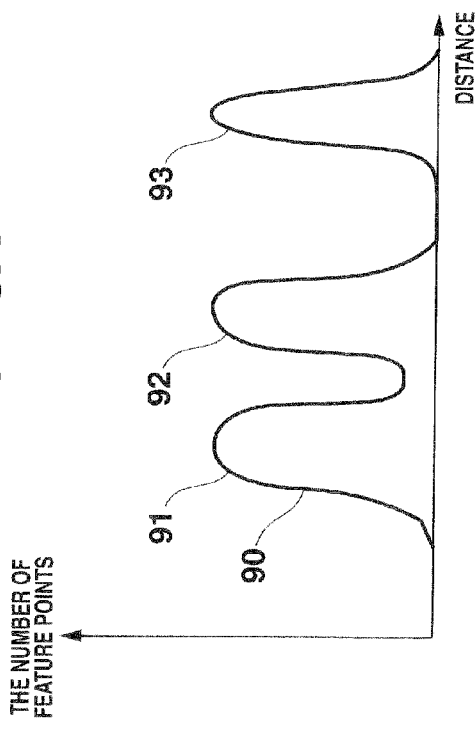
FIG. 18C is a graph showing a distribution map of feature points after correction.

FIG. 18C shows the three-dimensional display distance range 981 corrected by processing in the step SF7. As shown in FIG. 18C, the corrected three-dimensional display distance range 981 is narrower than the three-dimensional display distance range 98 before correction.

After processing in the step SF6 or processing in the step SF7, the CPU 8 records the corrected point information on respective header data of the photographic image data 50A and 50B (step SF8) and terminates the distance information correction process shown in the flow chart of FIG. 17.

In the aforementioned third embodiment, the CPU 8 corrects the point information 81 in processing in the step SF4 so that all pieces of distance information longer than the distance information Df of the rear end of depth of field are changed to the same distance information (as the distance information Df). However, the CPU 8 may perform correction so that pieces of distance information belonging to a range of distance longer than the distance information Df of the rear end of depth of field are reduced by the same distance information respectively.

Figure 18D:
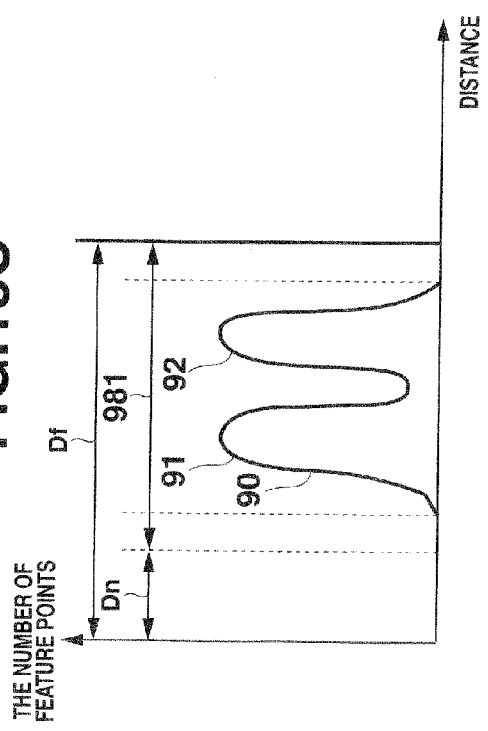
FIG. 18D is a graph showing a distribution map of feature points obtained by correction in a modification.

In this modification, for example, as shown in FIG. 18D, the CPU 8 corrects all pieces of distance information included in the point information 81 so that pieces of distance information corresponding to the peak portion 93 are reduced by the difference value between the distance information Df and the distance information corresponding to the start point of the peak portion 93 to thereby make distance information corresponding to the start point of the peak portion 93 match with the distance information Df of the rear end of depth of field.

In the third embodiment, the CPU 8 corrects distance information belonging to the three-dimensional display distance range 98 in distance information included in the point information 82 in processing in the step SF7 so that the three-dimensional display distance range 98 is changed to a distance range having the same value as the predetermined threshold if the set three-dimensional display distance range 98 is not smaller than the predetermined threshold.

However, the CPU 8 may correct all pieces of distance information Z belonging to the three-dimensional display distance range 98 included in the point information in processing in the step SF7, for example, in accordance with the following expression (7).

$$Z' = Z - (Df - Z) \cdot \alpha \quad (7)$$

In expression (7), Z is the value of distance information before correction (each piece of distance information belonging to the three-dimensional display distance range 98 before correction), Z' is the value of distance information after correction (each piece of distance information belonging to the three-dimensional display distance range 981 after correction), Df is the value of distance information of the rear end of depth of field, and $\alpha$ is any natural number smaller than 1.

As described above, in the third embodiment and modification thereof, the CPU 8 performs correction so that distance information belonging to a range of distance longer than the distance information Df of the rear end of depth of field in distance information included in the point information 81 is reduced. In this manner, even when, for example, the distance between the main subject and the subject as the background is long, the distance information between the main subject and the background subject in the point information is reduced. Accordingly, in the three-dimensional image generated based on the point information, irregular shaping of triangular polygons forming the three-dimensional image can be avoided. As a result, in this embodiment, a three-dimensional image in which the user can grasp the state of each subject easily, that is, a three-dimensional image high in visibility can be obtained.

In the third embodiment, as shown in FIG. 18B, a distance range corresponding to the position of existence of depth of field is set as the three-dimensional display distance range 98 automatically. There is a high possibility that the subject included in the depth of field, that is, the focused subject will be the main subject catching user's attention. For this reason, in the third embodiment, the main subject catching user's attention can be expressed three-dimensionally easily.

In the third embodiment, the CPU 8 performs correction so that all pieces of distance information longer than the distance information Df of the rear end of depth of field in distance information included in the point information 81 are equalized to the same distance information (as the distance information Df). In this manner, in the three-dimensional image generated based on the corrected point information, for example, the main subject can be expressed three-dimensionally while the background subject can be expressed two-dimensionally. Accordingly, the user can view the shape of the main subject three-dimensionally while the user can grasp the contents of the background subject easily. As a result, a three-dimensional image in which the user can grasp the contents of the background subject image easily, that is, a three-dimensional image high in visibility can be obtained in accordance with this embodiment.

In the third embodiment, the CPU 8 corrects distance information belonging to the three-dimensional display distance range 98 in distance information included in the point information so that the three-dimensional display distance range 98 is narrowed when the three-dimensional display distance range 98 is not smaller than the predetermined threshold. In this manner, even when distance information between feature points belonging to the three-dimensional display distance range 98 is too long, the point information can be corrected so that the distance information between the feature points is reduced. Accordingly, excessive enlargement of each triangular polygon forming the main subject expressed three-dimensionally on the three-dimensional image can be avoided. As a result, in accordance with this embodiment, even when the depth of the main subject or the like is large, the shape of the main subject expressed on the three-dimensional image can be corrected so properly that a three-dimensional image high in visibility can be obtained.

Fourth Embodiment

A distance information correction process according to a fourth embodiment of the invention (processing in the step SA8) will be described with reference to a flow chart shown in FIG. 19.

Figure 20:
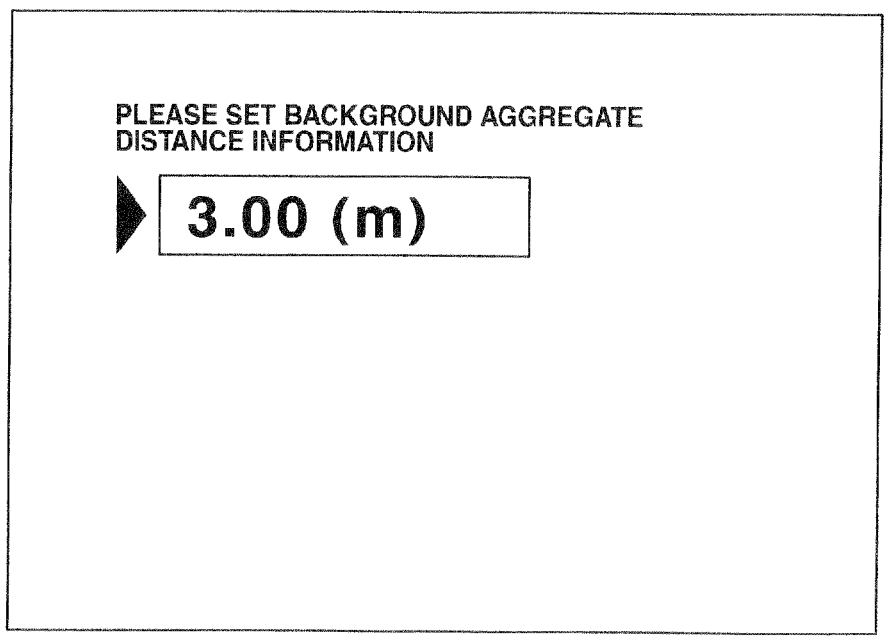
FIG. 20 is a view showing a screen for setting background aggregate distance information.

After processing in the step SA7, the CPU 8 displays a setting screen shown in FIG. 20 on the display unit 12 and stands ready to detect inputting of background aggregate distance information in accordance with a user's operation on the user interface 13 (step SG1).

When the CPU 8 cannot detect any input based on the user's operation (step SG1; NO), the CPU 8 remains standing ready. On the other hand, when the CPU 8 detects the input based on the user's operation (step SG1; YES), the CPU 8 sets background aggregate distance information input by the user's operation (step SG2). In this embodiment, assume that 4.00 (m) is set as the background aggregate distance information.

Then, the CPU 8 corrects the point information 81 so that all pieces of distance information belonging to a range of distance longer than the background aggregate distance information (4.00 (m)) set by processing in the step SG2 in respective pieces of distance information included in the point information 81 retained in the DRAM 10 are equalized to the set background aggregate distance information (4.00 (m)) (step SG3).

FIG. 21 shows a state of the point information 84, which is corrected by processing in the step SG3. As shown in FIG. 21, all pieces of distance information corresponding to respective feature points of the building 44, which were longer than the background aggregate distance information (4.00 (m)) in the original point information 81, are corrected to the background aggregate distance information (4.00 (m)).

Figure 19:
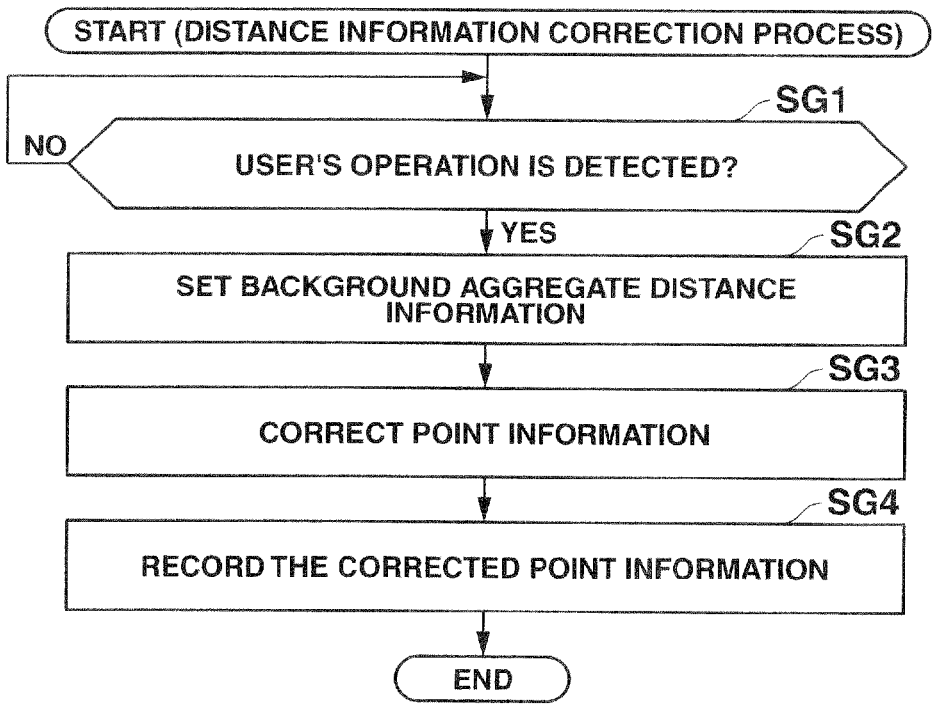
FIG. 19 is a flow chart showing the contents of a distance information correction process according to a fourth embodiment of the invention.

Then, the CPU 8 records the corrected point information 84 on respective header data of the photographic image data 50A and 50B (step SG4) and terminates the distance information correction process shown in the flow chart of FIG. 19.

In the fourth embodiment, the CPU 8 corrects the point information 81 in processing in the step SG3 so that all pieces of distance information longer than the background aggregate distance information set by the user's operation are changed to the same distance information (as the background aggregate distance information). However, the CPU 8 may perform correction so that pieces of distance information belonging to a range of distance longer than the background aggregate distance information set by the user's operation are reduced by the same distance information respectively.

As described above, in the fourth embodiment and modification thereof, the CPU 8 performs correction so that distance information belonging to a range of distance longer than the background aggregate distance information set by the user's operation in distance information included in the point information 81 is reduced. In this manner, even when, for example, the distance between the main subject and the subject as the background is long, the distance information between the main subject and the background subject in the point information is reduced. Accordingly, in the three-dimensional image generated based on the point information, irregular shaping of triangular polygons forming the three-dimensional image can be avoided. As a result, in this embodiment, a three-dimensional image in which the user can grasp the state of each subject easily, that is, a three-dimensional image high in visibility can be obtained.

In the fourth embodiment, the background aggregate distance information is set by the user's operation. Accordingly, the point information can be corrected so that distance information of a subject (such as a background subject) in a distance range desired by the user is reduced surely.

In the fourth embodiment, the CPU 8 performs correction so that all pieces of distance information longer than the background aggregate distance information in distance information included in the point information 81 are equalized to the same distance information (as the background aggregate distance information). In this manner, in the three-dimensional image generated based on the corrected point information, for example, the main subject can be expressed three-dimensionally while the background subject can be expressed two-dimensionally. Accordingly, the user can view the shape of the main subject three-dimensionally while the user can grasp the contents of the background subject easily. As a result, a three-dimensional image in which the user can grasp the contents of the background subject image easily, that is, a three-dimensional image high in visibility can be obtained in accordance with this embodiment.

The respective embodiments and modifications have been described in the case where the invention is applied to the digital camera. However, the invention can be applied to another camera device such as a digital video camera, a camera-including cellular phone terminal, etc. and an image generating device such as a personal computer, etc. if the device has a function of generating image information.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all of the components shown in each embodiment. Further, components in different embodiments may be used appropriately in combination.

What is claimed is:

1. An image generating apparatus comprising:
a correction unit configured to correct point information indicating correspondence between a plurality of pieces of point information indicating feature points of subjects in an image and a plurality of pieces of distance information of the respective pieces of point information so as to reduce the pieces of distance information belonging to a distance range that is longer than a distance indicated by a specific distance information included in the pieces of distance information;
an image information generation unit configured to generate image information for expressing a three-dimensional image based on the point information corrected by the correction unit; and
a display unit configured to display the three-dimensional image based on the image information generated by the image information generation unit.

2. The apparatus according to claim 1 further comprising a correspondence information generation unit configured to generate correspondence information indicating correspondence between number information indicating the number of pieces of the point information belonging to a target subject included in the subjects, the target subject corresponding to the same distance information, and each pieces of the distance information,
wherein the correction unit comprises:
a detection unit configured to detect the second shortest distance information included in the pieces of distance information corresponding to the pieces of distance information having substantially minimum number information from among the pieces of distance information included in the correspondence information generated by the correspondence information generation unit, as the specific distance information; and
a first distance information correction unit configured to perform correction to reduce the pieces of distance information belonging to the distance range that is longer than the distance indicated by the specific distance information detected by the detection unit, the specific distance information being included in the pieces of distance information included in the point information.

3. The apparatus according to claim 2, wherein the first distance information correction unit performs correction so that all of the pieces of distance information belonging to the distance range longer than the specific distance information detected by the detection unit are set to be the same as the specific distance information.

4. The apparatus according to claim 3, wherein the correction unit comprises:
a setting unit configured to set a distance range defined by two pieces of shortest distance information included in the pieces of distance information corresponding to the pieces of distance information having substantially minimum number information from among the pieces of distance information included in the correspondence information generated by the correspondence information generation unit, as a three-dimensional display distance range; and
a second distance information correction unit configured to correct the pieces of distance information belonging to the three-dimensional display distance range in the point information so as to narrow the three-dimensional display distance range set by the setting unit.

5. The apparatus according to claim 1, wherein the correction unit comprises a first distance information correction unit configured to performs correction so as to reduce the pieces of distance information belonging to the distance range longer than the specific distance information as distance information indicating distance to a focused subject region from among the pieces of distance information included in the point information.

6. The apparatus according to claim 5, wherein the first distance information correction unit performs correction so that all of the pieces of distance information belonging to the distance range longer than the specific distance information are set to be the same as the specific distance information.

7. The apparatus according to claim 6, wherein the correction unit comprises:
a setting unit configured to set a distance range corresponding to distance information indicating distance to a focused subject region as a three-dimensional display distance range; and
a second distance information correction unit configured to correct the pieces of distance information belonging to the three-dimensional display distance range in the point information so as to narrow the three-dimensional display distance range set by the setting unit.

8. The apparatus according to claim 1, wherein the correction unit comprises a first distance information correction unit configured to perform correction so as to reduce the pieces of distance information belonging to a distance range longer than the specific distance information as distance information corresponding to a position where depth of field exists in the pieces of distance information included in the point information.

9. The apparatus according to claim 8, wherein the first distance information correction unit performs correction so that all of the pieces of distance information belonging to a distance range longer than the specific distance information in the pieces of distance information included in the point information are set to be the same as the specific distance information.

10. The apparatus according to claim 9, wherein the correction unit comprises:
a setting unit configured to set a distance range corresponding to a position of depth of field as three-dimensional display distance range; and
a second distance information correction unit configured to correct the pieces of distance information belonging to the three-dimensional display distance range in the point information so as to narrow the three-dimensional display distance range set by the setting unit.

11. The apparatus according to claim 1, wherein the correction unit comprises a first distance information correction unit configured to perform correction so as to reduce the pieces of distance information belonging to a distance range longer than the specific distance information as distance information determined based on an operation by a user in the pieces of distance information included in the point information.

12. The apparatus according to claim 11, wherein the first distance information correction unit performs correction so that all of the pieces of distance information belonging to a distance range longer than the specific distance information in the pieces of distance information included in the point information are set to be the same as the specific distance information.

13. A non-transitory computer readable medium storing a program causing a computer to execute a process for generating image, wherein the process comprises:

correcting point information indicating correspondence between a plurality of pieces of point information indicating feature points of subjects in an image and a plurality of pieces of distance information of the respective pieces of point information so as to reduce the pieces of distance information belonging to a distance range that is longer than a distance indicated by a specific distance information included in the pieces of distance information;

generating image information for expressing a three-dimensional image based on the corrected point information corrected; and displaying the three-dimensional image based on the generated image information.

\* \* \* \* \*